(12) United States Patent
Fujikawa

(10) Patent No.: US 9,009,275 B2
(45) Date of Patent: Apr. 14, 2015

(54) IMAGE FORMING APPARATUS, CONTROL METHOD OF IMAGE FORMING APPARATUS, PROGRAM, AND STORAGE MEDIUM

(75) Inventor: Shinji Fujikawa, Yokahama (JP)

(73) Assignee: Canon Kabushiki Kaisha (JP)

( * ) Notice: Subject to any disclaimer, the term of this patent is extended or adjusted under 35 U.S.C. 154(b) by 1491 days.

(21) Appl. No.: 12/101,090

(22) Filed: Apr. 10, 2008

(65) Prior Publication Data

US 2008/0256630 A1 Oct. 16, 2008

(30) Foreign Application Priority Data

Apr. 11, 2007 (JP) ................................. 2007-104214

(51) Int. Cl.
G06F 15/16 (2006.01)
H04N 1/00 (2006.01)

(52) U.S. Cl.
CPC ....... *H04N 1/00464* (2013.01); *H04N 1/00411* (2013.01); *H04N 1/00915* (2013.01); *H04N 2201/0094* (2013.01); *H04N 2201/0098* (2013.01)

(58) Field of Classification Search
CPC .......... H04N 1/00464; H04N 1/00411; H04N 1/00915; H04N 2201/0094; H04N 2201/0098
See application file for complete search history.

(56) References Cited

U.S. PATENT DOCUMENTS

| | | | | |
|---|---|---|---|---|
| 5,716,148 A | * | 2/1998 | Tamagaki | 400/74 |
| 5,812,529 A | * | 9/1998 | Czarnik et al. | 370/245 |
| 7,080,230 B2 | * | 7/2006 | Bennett et al. | 711/173 |
| 7,188,360 B2 | * | 3/2007 | Gerdes et al. | 726/4 |
| 7,522,296 B2 | | 4/2009 | Ozawa et al. | |
| 8,364,968 B2 | * | 1/2013 | Corcoran et al. | 713/182 |
| 8,572,685 B2 | * | 10/2013 | Caplis et al. | 726/2 |
| 8,756,285 B2 | * | 6/2014 | Kosuda | 709/206 |
| 2002/0103908 A1 | * | 8/2002 | Rouse et al. | 709/227 |
| 2004/0138939 A1 | * | 7/2004 | Theiler | 705/8 |

(Continued)

FOREIGN PATENT DOCUMENTS

| | | |
|---|---|---|
| JP | 7-334572 A | 12/1995 |
| JP | 8-223382 A | 8/1996 |

(Continued)

OTHER PUBLICATIONS

English computerized translation of Fukuda et al.,; JP07334572 A; Dec. 22, 1995; Entire document.*

(Continued)

*Primary Examiner* — Krista Zele
*Assistant Examiner* — Anthony Fabbri
(74) *Attorney, Agent, or Firm* — Rossi, Kimms & McDowell LLP

(57) ABSTRACT

An image forming apparatus for executing a processing flow including a plurality of steps, includes a determination unit which determines whether or not a processing flow to be executed includes an instruction required step that requires an instruction of a user, a selection unit which selects, when the processing flow to be executed includes the instruction required step, a notification destination of information required to display an operation window for accepting the instruction of the user, a notification control unit which notifies the notification destination selected by the selection unit of the operation window, and an execution unit which executes processing of the instruction required step according to instruction contents input via the operation window.

15 Claims, 28 Drawing Sheets

(56) References Cited

U.S. PATENT DOCUMENTS

| | | | |
|---|---|---|---|
| 2004/0153560 A1* | 8/2004 | Masuhiro et al. | 709/229 |
| 2004/0194010 A1* | 9/2004 | Kirihara et al. | 715/500 |
| 2005/0099962 A1* | 5/2005 | Matsuda | 370/254 |
| 2005/0289224 A1* | 12/2005 | Deslippe et al. | 709/208 |
| 2006/0200854 A1* | 9/2006 | Saito | 726/2 |
| 2007/0011334 A1* | 1/2007 | Higgins et al. | 709/227 |
| 2008/0252922 A1* | 10/2008 | Ikegami et al. | 358/1.15 |
| 2009/0205030 A1* | 8/2009 | Ong | 726/6 |
| 2009/0237201 A1* | 9/2009 | Sato | 340/5.2 |
| 2011/0075191 A1* | 3/2011 | Meunier et al. | 358/1.15 |
| 2012/0188600 A1* | 7/2012 | Oshima et al. | 358/1.15 |

FOREIGN PATENT DOCUMENTS

| | | |
|---|---|---|
| JP | 2001-150763 A | 6/2001 |
| JP | 2004-289672 A | 10/2004 |
| JP | 2006-094127 A | 4/2006 |

OTHER PUBLICATIONS

Japanese Office Action for corresponding JP 2007-104214, dated Dec. 16, 2011.

* cited by examiner

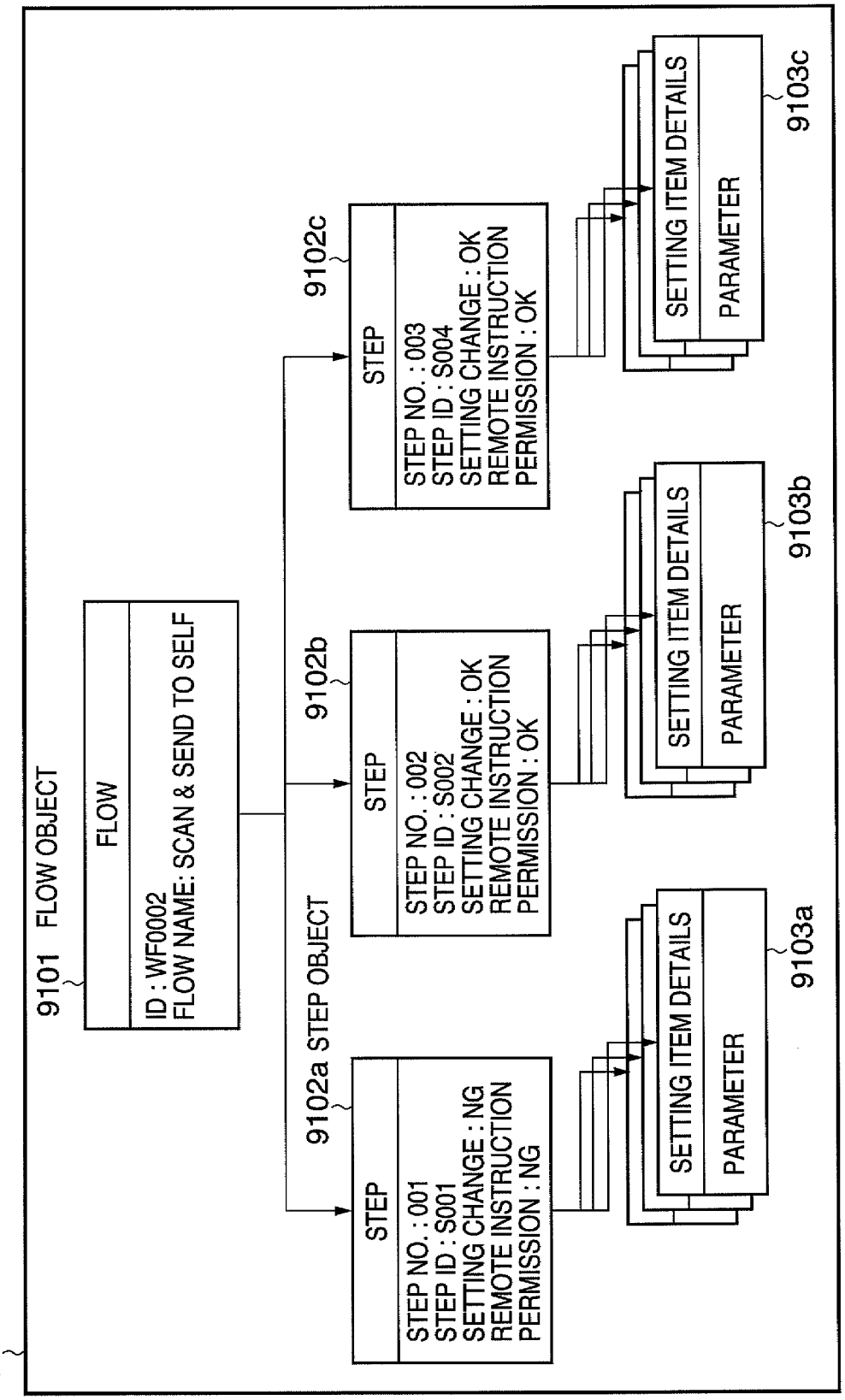

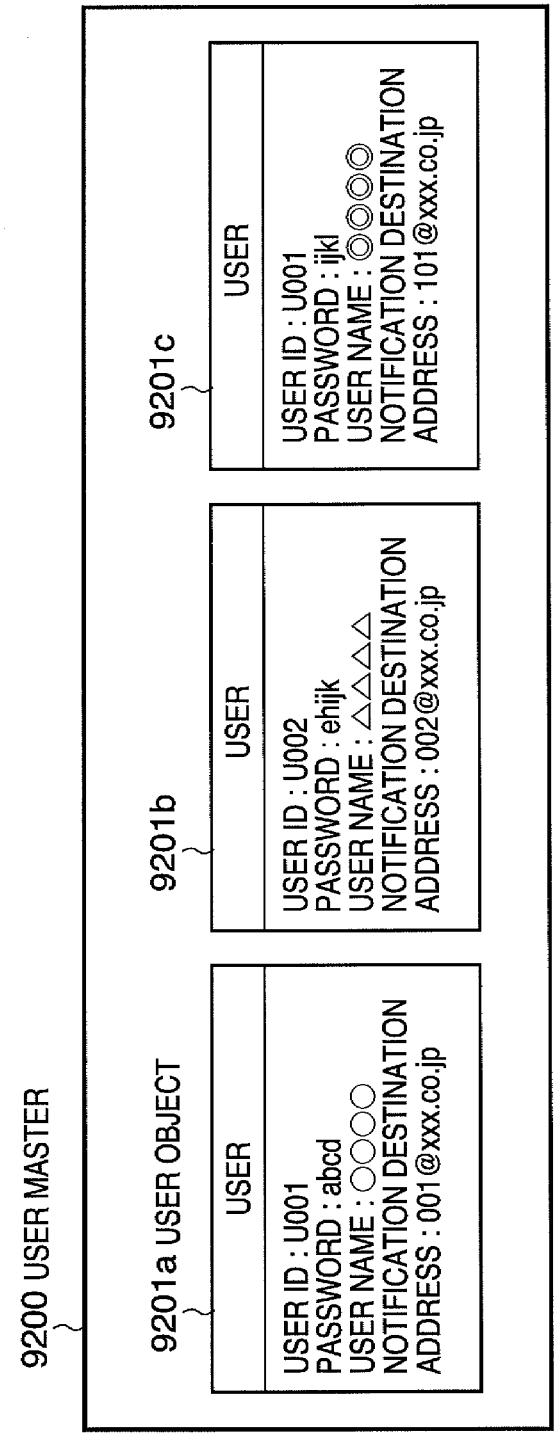

| | |
|---|---|
| STEP EDIT: EXECUTE SCANNING | _ ▢ ✕ |

- 11002 — FLOW ID : `WF0002`
- 11003 — FLOW NAME : `SCAN & SEND TO SELF`
- 11004 — STEP NO. : `001`
- 11005 — STEP CONTENTS : `EXECUTE SCANNING`
- 11006 — ☐ PERMIT SETTING CHANGE BY USER

SETTING ITEM DETAILS (11007)

- COLOR SELECTION : ▼ COLOR AUTO
- RESOLUTION : ▼ 300dpi×300dpi
- SCALE : ▼ EQUAL SCALE
- SCAN SIZE : ▼ AUTO
- DENSITY : ▼ DARK
- DOUBLE-SIDED : ▼ DOUBLE-SIDED (RIGHT OPEN)
- ORIGINAL TYPE : ▼ TEXT / PHOTO

STEP EXECUTION METHOD (11008)

☐ PERMIT REMOTE INSTRUCTION

[ CANCEL ] (11010)   [ OK ] (11011)

FIG. 17

| SUSPEND ID | FLOW ID | STEP NO. | WORK AREA | FLOW EXECUTION USER |
|---|---|---|---|---|
| P001 | WF002 | 002 | / flowarea / p001 / | U001 |
| P002 | WF010 | 002 | / flowarea / p002 // | U002 |
| ... | ... | ... | ... | ... |
| ... | ... | ... | ... | ... |

F I G. 19
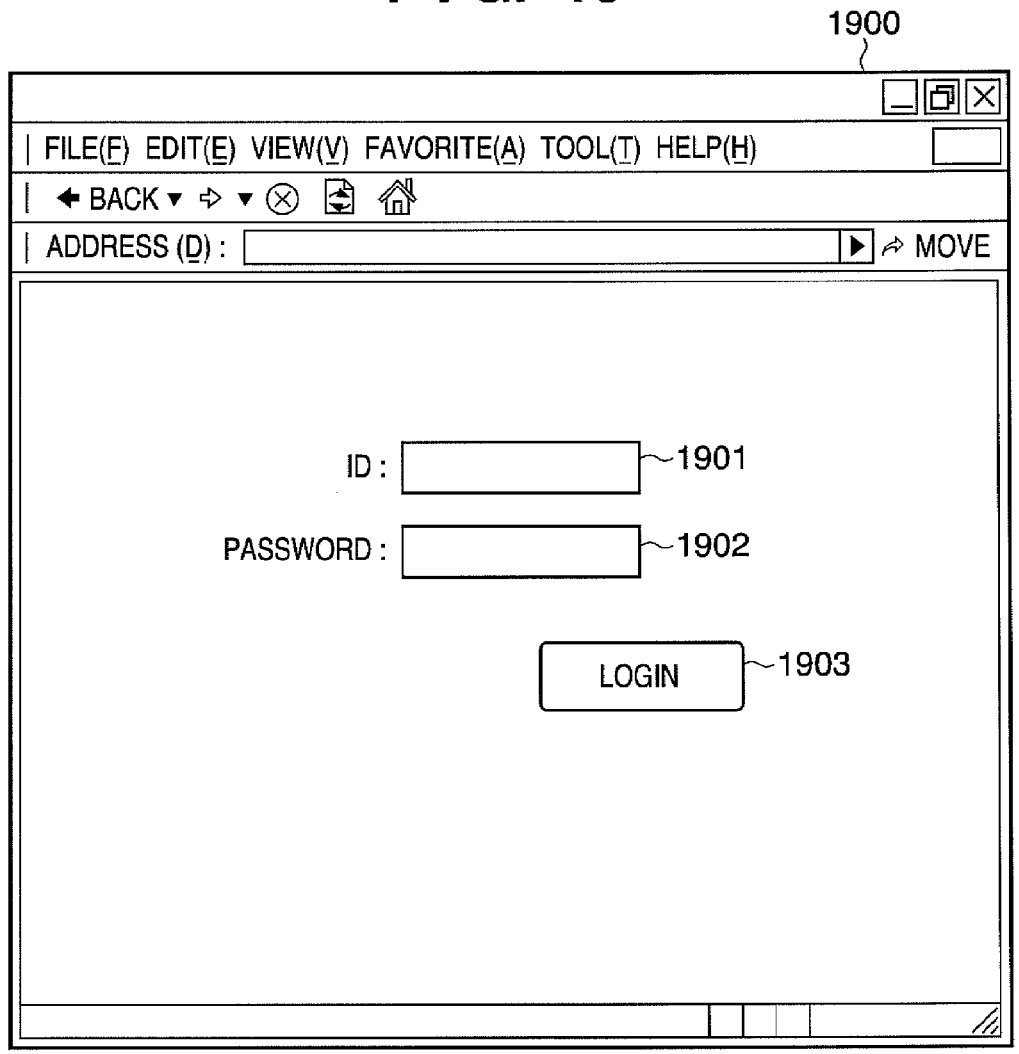

FIG. 21

```
<html>
<head><title><head><title> DISPLAY PREVIEW </title></title>
<body..........>                                                    2101
..........
    <form action="http://192.168.0.1/webserver/exe/r002.pl"method="post">
    ..........
    <img src="http://192.168.0.1/webserver/temp/p001/1.jpg">
    ..........
    <input type=hidden name="PID" value="P001">              2102
    <input type=hidden name="UID" value="U001">
    ..........
    <input type=image name="prev_page"src="prev.gif">
    <input type=image name="next_page"src="next.gif">1/5     2103
    ..........
    <input type=image name="cancel"src="cancel.gif">
    ..........
    <input type=image name="ok"src="ok.gif">                 2104
    ..........
    </form>
    ..........
</body>
</html>
```

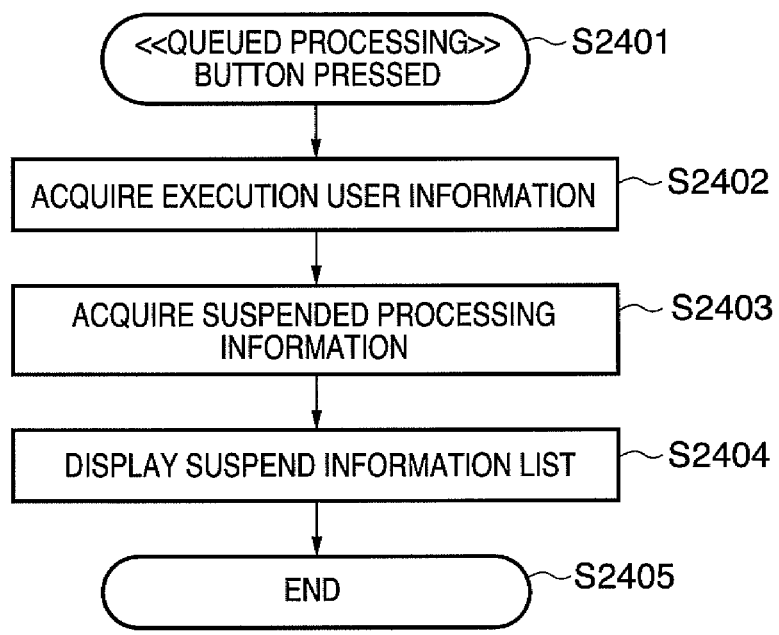
F I G. 24

F I G. 25
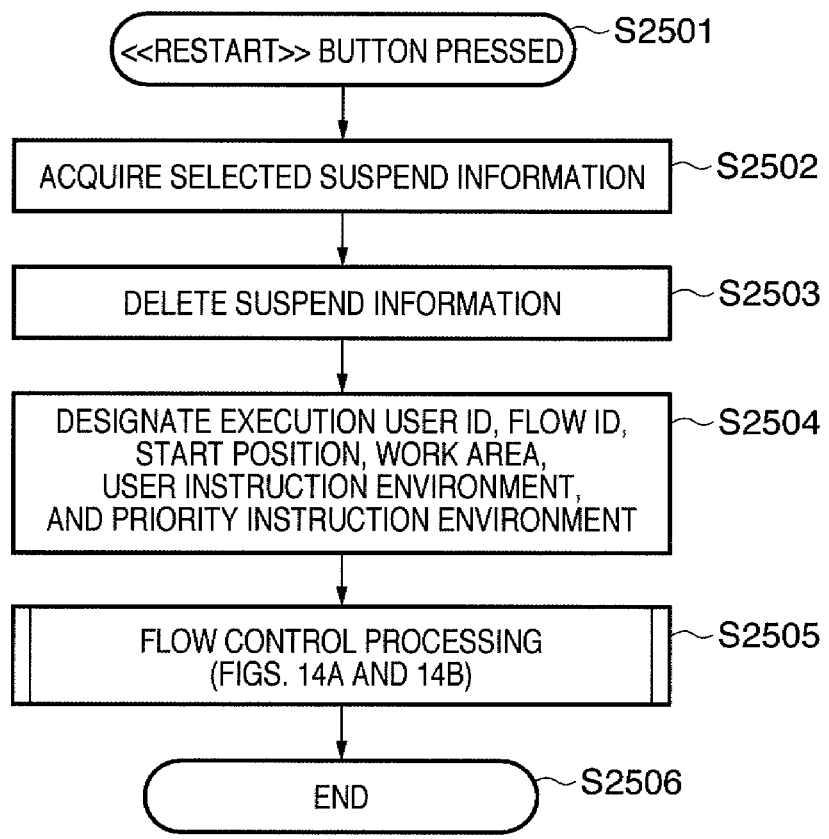

IMAGE FORMING APPARATUS, CONTROL METHOD OF IMAGE FORMING APPARATUS, PROGRAM, AND STORAGE MEDIUM

BACKGROUND OF THE INVENTION

1. Field of the Invention

The present invention relates to an image forming apparatus which has functions of a printer, copying machine, facsimile apparatus, and the like, a control method of the image forming apparatus, and the like.

2. Description of the Related Art

Image forming apparatuses such as a printer, copying machine, facsimile apparatus, and the like have been developed as multifunction peripherals (MFPs) which integrate these functions as the functions become complicated. Such MFPs comprise more advanced functions of editing images on themselves, executing processing in cooperation with external services or the like, and so forth. Furthermore, MFPs which can execute a plurality of processes to be executed that are combined into one sequence, are increasing for the purpose of facilitation of users' works in an office. Note that one sequence obtained by combining a plurality of processes will be referred to as a "processing flow" and each process included in the flow will be referred to as a "step" hereinafter.

Such flow is executed on the MFP upon reception of a user's instruction. The MFP executes all the steps included in the flow in response to an execution start instruction. However, some steps included in the flow require an individual user's instructions as for execution of these steps.

For example, the flow may include a "preview confirmation" step that displays a scan result after originals are scanned. In this step, the user needs to input an instruction to move pages to be displayed, or a confirmation end instruction to the MFP by pressing buttons or the like. Also, in a step of sending an e-mail message by appending a scanned original file to it, the MFP often prompts the user to designate a destination mail address and mail title. When the user gives the instruction to execute the flow including such steps and the process advances to a step that requires a user's instruction, the MFP interrupts the processing of the flow by displaying a window for waiting for a user's instruction.

When the user is near the MFP even after he or she has given the instruction to start the processing flow, the user can issue an instruction by watching the window of the MFP, thus posing no problem. However, the user does not always recognize the processing contents of all steps included in the flow. When the user gives the instruction to execute the flow and moves away from the MFP soon, he or she cannot confirm the window displayed by the MFP.

In such case, the MFP displays the window that waits for a user's instruction, and is suspended in that state. In order to proceed with the flow, the user needs to return to the MFP and to issue an instruction. Some MFPs have a function of forcibly canceling the processing after an elapse of a predetermined period of time while it is left untouched without any instruction. In either case, the user needs to move or to redo the processing from the beginning, thus impairing convenience.

Hence, when the user is away from the MFP, a function of notifying the user that his or her instruction is required, and allowing the user to issue an instruction to the MFP from a remote place such as his or her own seat is required.

For example, Japanese Patent Laid-Open No. 2001-150763 discloses a printer which eliminates trouble associated with printing when such trouble is posed. This printer comprises a trouble notification unit such as a UI or the like which notifies a computer of a trouble, and instructs the computer to execute a coping method, and an elimination processor which executes processing for eliminating the trouble upon reception of an instruction for eliminating the trouble from the computer.

However, the aforementioned related art covers notification of an accidental event, that is, a trouble that occurs in a printer, and an instruction to eliminate that trouble. The related art does not consider who is notified of occurrence of a trouble and from whom an instruction is received. For example, assume that users A and B independently give the instruction to start execution of the flows including steps that require a user's instructions. In this case, user A needs to issue a restart instruction to the flow that he or she gave the instruction to start execution for. On the other hand, user B needs to issue a restart instruction to the flow that he or she gave the instruction to start execution for. In other words, a method of allowing restart of the flow for each user is required. That is, when user A gives the instruction to restart the flow, the flow for user B is not started.

In the related art, when a trouble of the printer is notified, and the user issues an instruction from a computer to eliminate the trouble, the printer restarts the processing. If the flow that user A gives the instruction to start execution for includes a step that requires an instruction, a notification is sent to user B, and user B issues an instruction to that step, thereby restarting the flow. Since the flow is processed although user A has not ever issued an instruction, trouble may occur.

Since trouble is an accidental event, its timing of occurrence cannot be predicted in advance. Hence, when the user sets the notification method and instructions to prepare for unpredictable events, the operability may be impaired.

The present invention has been made in consideration of the aforementioned problems, and has as its object to allow the user to efficiently and appropriately restart execution of the flow when the flow suspends to wait for a user's instruction.

SUMMARY OF THE INVENTION

In order to achieve the above object, an image forming apparatus and a control method of an image forming apparatus according to the present invention mainly comprise the following arrangements.

According to one aspect of the present invention, there is provided an image forming apparatus for executing a processing flow including a plurality of steps, comprising: a determination unit adapted to determine whether or not a processing flow to be executed includes an instruction required step that requires an instruction of a user; a selection unit adapted to select, when the processing flow to be executed includes the instruction required step, a notification destination of information required to display an operation window for accepting the instruction of the user; a notification control unit adapted to notify the notification destination selected by the selection unit of the operation window; and an execution unit adapted to execute processing of the instruction required step according to instruction contents input via the operation window.

According to another aspect of the present invention, there is provided a method of controlling an image forming apparatus for executing a processing flow including a plurality of steps, comprising: a determination step of controlling a determination unit to determine whether or not a processing flow to be executed includes an instruction required step that requires an instruction of a user; a selection step of controlling a selection unit to select, when the processing flow to be executed includes the instruction required step, a notification destination of information required to display an operation window for accepting the instruction of the user; a notification control step of controlling a notification control unit to notify the notification destination selected in the selection step of the operation window; and an execution step of controlling an execution unit to execute processing of the instruction required step according to instruction contents input via the operation window.

According to the present invention, even when the flow is suspended to wait for a user's instruction, the user can restart execution of the flow by issuing an instruction from a Web operation program.

Further features of the present invention will become apparent from the following description of exemplary embodiments with reference to the attached drawings.

BRIEF DESCRIPTION OF THE DRAWINGS

FIG. 9B is a view for explaining a flow master 9100 which defines details of a flow and the configuration of steps;

FIG. 9C is a view for explaining a user master 9200 as user information of each user who executes the flow;

FIG. 11 shows an example of a step edit window used to set detailed information of a step, which is called upon pressing a setting button 10202 in FIG. 10;

FIG. 17 shows an example of a data format of suspend information;

FIG. 19 shows an example of an authentication processing window;

FIG. 21 shows an HTML description example of the window of the "display preview" step;

FIG. 24 is a flowchart for explaining the sequence of processing for displaying a suspended process in the queued processing list window shown in FIG. 23; and FIG. 25 is a flowchart for explaining the sequence of processing for restarting the suspended flow from the queued processing list window shown in FIG. 23.

DESCRIPTION OF THE EMBODIMENTS

Preferred embodiments of the present invention will be described in detail hereinafter with reference to the accompanying drawings. Note that components described in these embodiments are merely examples, and the technical scope of the present invention is settled by the appended claims but it is not limited by each individual embodiment to be described hereinafter.

First Embodiment (Arrangement of Network)

Figure 1:
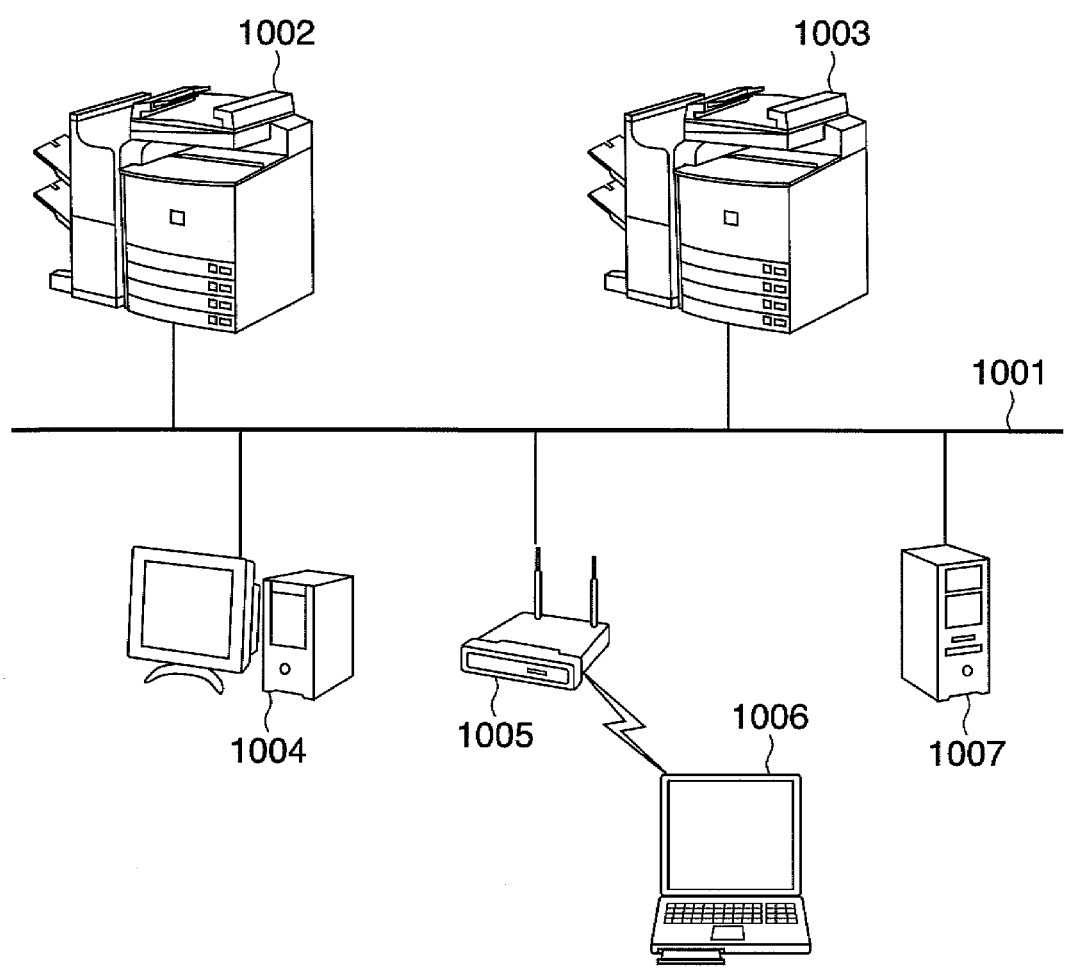
FIG. 1 is a diagram showing the arrangement of a network including an image forming apparatus according to an embodiment of the present invention.

FIG. 1 is a diagram showing the arrangement of a network including an image forming apparatus according to an embodiment of the present invention. A multifunctional peripheral (MFP) 1002 and MFP 1003 have equivalent functions. The MFPs 1002 and 1003, an information processing apparatus (computer) 1004, a wireless router 1005, a mail server 1007, and the like are connected to a network 1001 such as Ethernet or the like. An information processing apparatus (notebook type computer) 1006 has a wireless network connection function, and establishes connection to the wireless router 1005, so that it can be connected to the network 1001.

The MFP 1002 has a copy function and FAX function, and also a Web server function of processing accesses from respective apparatuses on the network 1001. With this Web server function, the MFP 1002 can execute a Web application which accepts a processing request from a Web client function such as a browser or the like of each apparatus on the network, and returns the processing result.

The MFP 1003 includes an Internet browser application, and can access the Web server function of the MFP 1002 via the network 1001.

The computer 1004 and notebook type computer 1006 include Internet browser applications, and can access the Web server function of the MFP 1002 via the wireless router 1005 and network 1001.

The mail server 1007 is used when a mail send function of the MFP 1002 sends an e-mail message. The mail server 1007 is a server which has a function of forwarding an outgoing e-mail message from the MEP 1002 to a reception server with a designated address.

(Hardware Arrangement of MFP)

Figure 2:
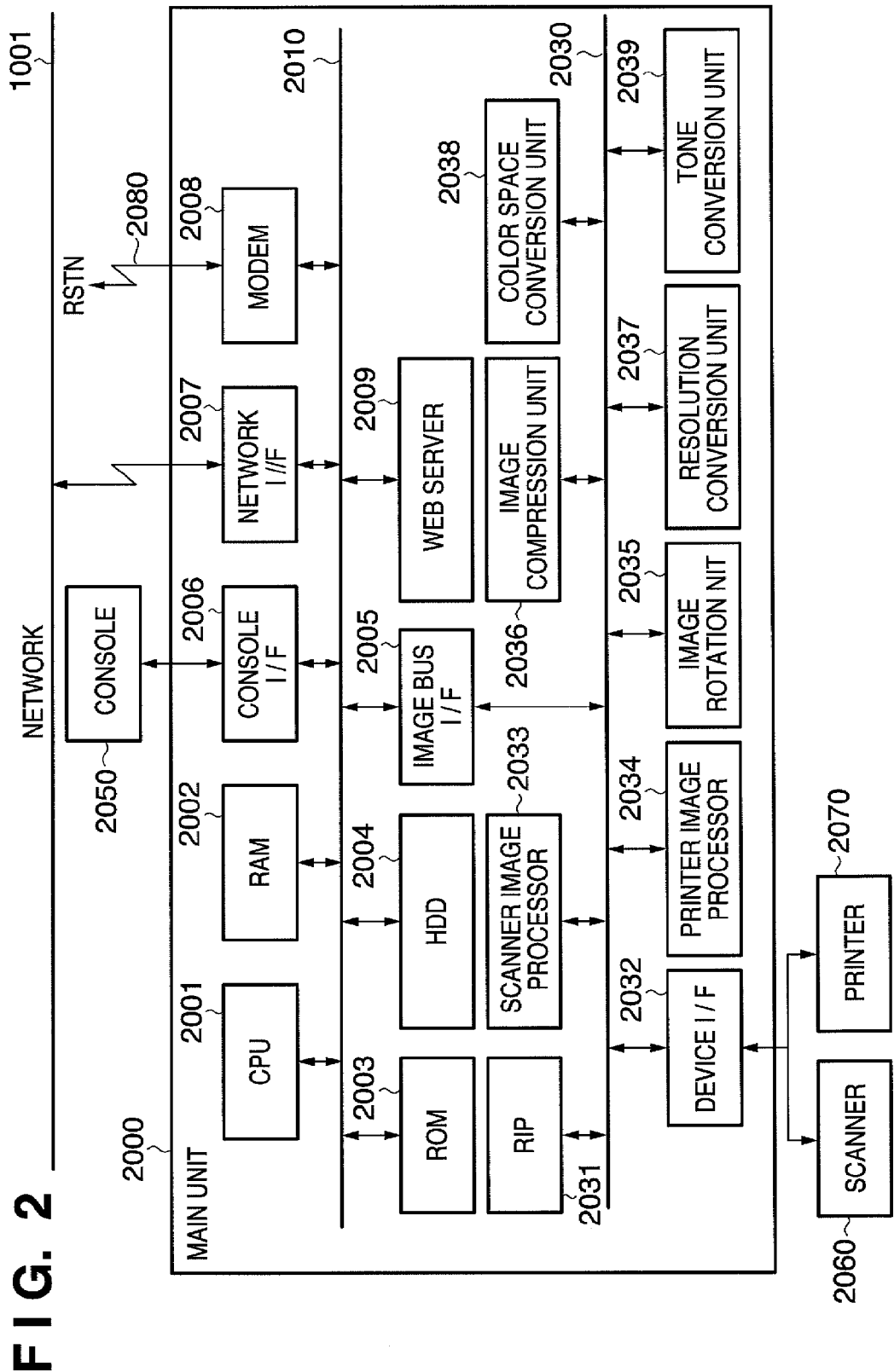
FIG. 2 is a block diagram for explaining the hardware arrangement of the image forming apparatus shown in FIG. 1.

FIG. 2 is a block diagram for explaining the hardware arrangement of the image forming apparatus (MFP) 1002 shown in FIG. 1. A main unit 200 is a controller for inputting and outputting document data, image information, and device information. The main unit 2000 connects a scanner 2060 as an image input device and a printer 2070 as an image output device to implement a scan function, print function, and the like. The main unit 2000 connects external apparatuses such as the MFP 1003, computer 1004, and the like via the network 1001 to implement a data exchange function, and also connects a public switched telephone network (PSTN) 2080 to implement a FAX function. The main unit 2000 is connected to a console 2050 as an interface which provides these functions to the user.

A CPU 2001 is a controller for controlling the overall main unit. A RAM 2002 is a system work memory required for the operation of the CPU 2001, and is also used as an image memory for temporarily storing image data. A ROM 2003 is a boot ROM, which stores a boot program of a system. An HDD 2004 is a hard disk drive, which stores system software, image data and their attribute data, other user data, and the like. Also, the HDD 2004 is used to store a remote instruction program main body, suspend information of a flow, and the like as characteristic features of this embodiment.

A console I/F 2006 is an interface unit with the console (UI) 2050, and outputs image data to be displayed to the console 2050. Also, the console I/F 2006 informs the CPU 2001 of information input by the user of this system from the console 2050. The CPU 2001 serves as an information controller. The console I/F 2006 serves as a display controller.

A network interface (Network I/F) 2007 is connected to the network 1001 to exchange information with external apparatuses such as another MFP, PC, and the like connected to a LAN. Assume that this system supports TCP/IP as a network communication protocol, and communicates with the external apparatuses according to the TCP/IP communication protocol.

A modem (MODEM) 2008 is connected to the PSTN 2080 to exchange image information with a FAX apparatus allocated on a communication line using the FAX function.

A Web server 2009 is a server function which can provide a Web application represented by a Servlet, CGI (Common Gateway Interface), and the like. The Web server 2009 receives an HTTP request from a client such as a browser or the like installed in the computer 1004 or the like connected via the network 1001. The Web server 2009 can interpret details of the request, can execute a program designated by the request from a program group stored in the HDD 2004, and can return the execution result to the client.

An Image Bus I/F 2005 is a bus bridge which connects a system bus 2010 and an image bus 2030 which transfers image data at high speed, and converts the data structure. The image bus 2030 comprises a PCI bus or IEEE1394.

On the image bus 2030, the following devices are connected. A raster image processor (RIP) 2031 rasterizes PDL code data input from the computer connected to the network 1001 into bitmap image data. A device I/F unit 2032 connects the scanner 2060 and printer 2070 as image input and output devices to the main unit 2000 to perform synchronous/asynchronous conversion of image data.

A scanner image processor 2033 corrects, modifies, and edits input image data. Also, the scanner image processor 2033 has a function of checking based on a saturation signal of the image if an input image is a color or monochrome original, and holding the checking result.

A printer image processor 2034 corrects, modifies, and edits output image data. An image rotation unit 2035 can rotate an image and store the rotated image on a memory simultaneously with image scanning from the scanner 2060 in cooperation with the scanner image processor 2033, and can also rotate an image on the memory. Furthermore, the image rotation unit 2035 can print out an image stored on the memory or that on the memory while rotating it in cooperation with the printer image processor 2034. A resolution conversion unit 2037 converts the resolution of an image on the memory, and stores that image on the memory. A color space conversion unit 2038 converts, for example, a YUV image on the memory into a Lab image by matrix calculations, and stores the converted image on the memory. A tone conversion unit 2039 converts, for example, an 8-bit, 256-tone image on the memory into a 1-bit, 2-tone (binary) image by a method such as error-diffusion processing or the like, and stores the converted image on the memory. An image compression unit 2036 applies JPEG compression/decompression processing to multi-valued image data, and compression/decompression processing of JBIG, MMR, MR, or MH to binary image data.

The image rotation unit 2035, resolution conversion unit 2037, color space conversion unit 2038, tone conversion unit 2039, and image compression unit 2036 can operate in cooperation with each other. For example, an image on the memory can undergo rotation and resolution conversion without going through the memory.

Figure 3:
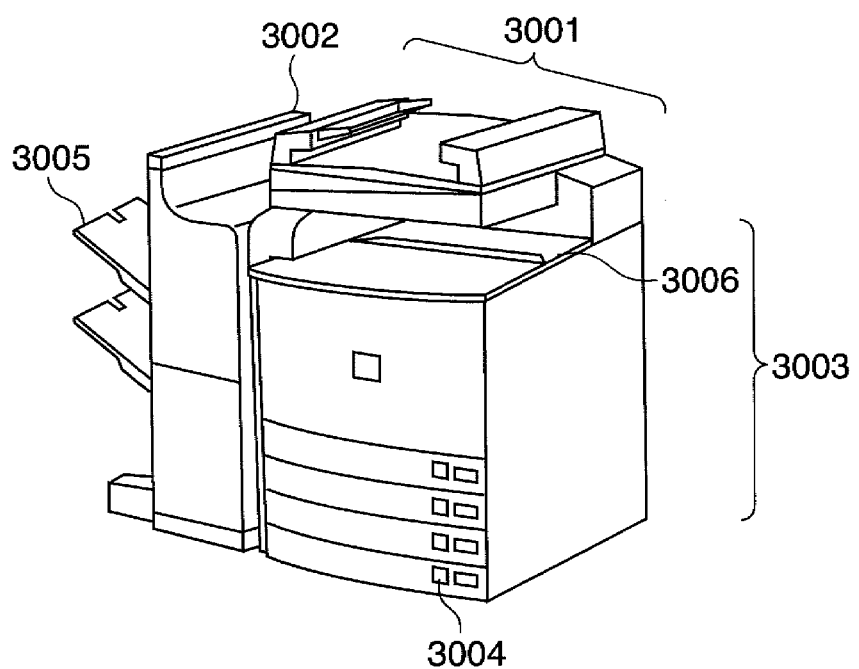
FIG. 3 is a schematic view showing the outer appearance of the image forming apparatus according to the embodiment.

FIG. 3 is a schematic view showing the outer appearance of the image forming apparatus according to this embodiment. The image forming apparatus is presented to the user as an MFP which comprises a document compositing function, FAX function, printer function, and document management function.

A scanner unit 3001 as an image input device irradiates an image on a paper sheet as an original with light, and scans a CCD line sensor, thereby converting the image into an electrical signal as raster image data. Original paper sheets are set on a tray of a document feeder 3002. When the user of this system inputs a scan start instruction from a console 3006, the CPU 2001 of the main unit 2000 shown in FIG. 2 supplies an instruction to the scanner 2060. Furthermore, the document feeder 3002 feeds original paper sheets one by one, and scans images on originals.

A printer unit 3003 as an image output device converts raster image data into an image to be formed on a paper sheet. A print method of the printer unit 3003 includes an electrophotographic method using a photosensitive drum or photosensitive belt, an ink-jet method which ejects ink from a micro nozzle array to directly print an image on a paper sheet, and the like. However, the present invention is not limited to a particular print method.

Print processing starts in response to an instruction from the CPU 2001. The printer unit 3003 has a plurality of paper decks 3004 which allow the user to select different paper sizes or different paper orientations, and corresponding paper cassettes are set in these decks when they are used. An exhaust tray 3005 receives printed paper sheets, and sorting, stapling, and the like can be set according to an instruction from the CPU 2001.

A step that requires a user's instruction to be described in this embodiment normally displays a message that prompts the user to input an instruction and a UI that accepts an instruction on a display unit of the console 3006, thus waiting for a user's instruction.

(Practical Arrangement of Information Processing Apparatus)

Figure 8:
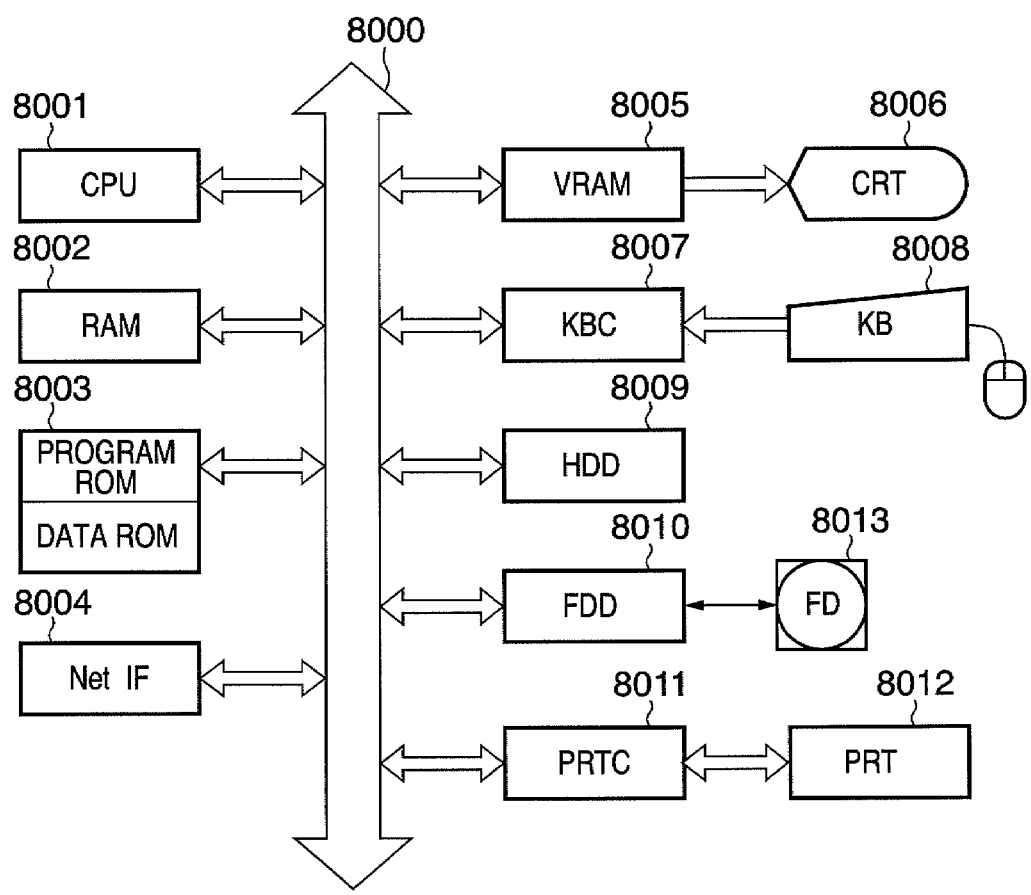
FIG. 8 is a block diagram showing an example of a practical arrangement of a computer 1004 and a notebook type computer 1006 as an information processing apparatus.

FIG. 8 shows an example of the practical arrangement of the computer 1004 and notebook type computer 1006 as the information processing apparatus. Referring to FIG. 8, a CPU 8001 is a central processing unit which performs arithmetic operations and control of the information processing apparatus. Reference numeral 8002 denotes a random access memory (to be abbreviated as a RAM hereinafter), which serves as a main memory of the CPU 8001, and an area for a program to be executed, an execution area for a program, and a data area.

Reference numeral 8003 denotes a read only memory (to be abbreviated as a ROM hereinafter) which stores the operation processing sequence. The ROM 8003 includes a program ROM which records basic software (OS) as a system program for implementing device control of the information processing apparatus, and a data ROM which records information and the like required to operate the system. An HDD 8009 to be described later may be used in place of the ROM 8003.

Reference numeral 8004 denotes a network interface (Net IF), which makes control for data transfer between information processing apparatuses via the network and diagnoses a connection state. Reference numeral 8005 denotes a video RAM (VRAM), which rasterizes an image to be displayed on a screen of a CRT 8006 (to be described later) to indicate the operation state of the information processing apparatus, and executes display control of the image.

Reference numeral 8006 denotes a display device (to be referred to as a CRT hereinafter) such as a display or the like. Reference numeral 8007 denotes an external input controller (to be referred to as a KBC hereinafter) for controlling an input signal from an external input device (KB) 8008. Reference numeral 8008 denotes an external input device (to be referred to as a KB hereinafter) which accepts an operation made by the user. As the KB 8008, for example, a keyboard and a pointing device such as a mouse or the like are used.

Reference numeral 8009 denotes a hard disk drive (to be abbreviated as an HDD hereinafter), which is used to save application programs and various data. The application programs of this embodiment include software programs for implementing various processing modules in this embodiment.

Reference numeral 8010 denotes an external input and output device (to be referred to as an FDD hereinafter), such as a floppy disk drive, CD-ROM drive, or the like, which is used to input and output data from and to a removable disk. The FDD 8010 is used to read out the aforementioned application programs from media.

Reference numeral 8013 denotes a detachable (or removable) data recording device from which data is read out by the FDD 8010. The data recording device 8013 includes magnetic recording media (for example, a flexible disk, external hard disk), optical recording media (for example, a CD), magneto-optical recording media (for example, an MO), semiconductor recording media (for example, a memory card), and the like. Such medium will be referred to as an FD hereinafter. Note that the application programs and data to be stored in the HDD 8009 may be stored in the FD 8013 when they are used.

Reference numeral 8011 denotes a controller (to be referred to as a PRTC hereinafter) for controlling an output signal to a printing device (PRT) 8012. The printing device (PRT) 8012 can use an LBP (Laser Beam Printer), an ink-jet printer, or the like. Reference numeral 8000 denotes a transfer bus (address bus, data bus, input and output bus, and control bus) used to interconnect the aforementioned units.

(Software Configuration of Image Forming Apparatus)

Figure 4:
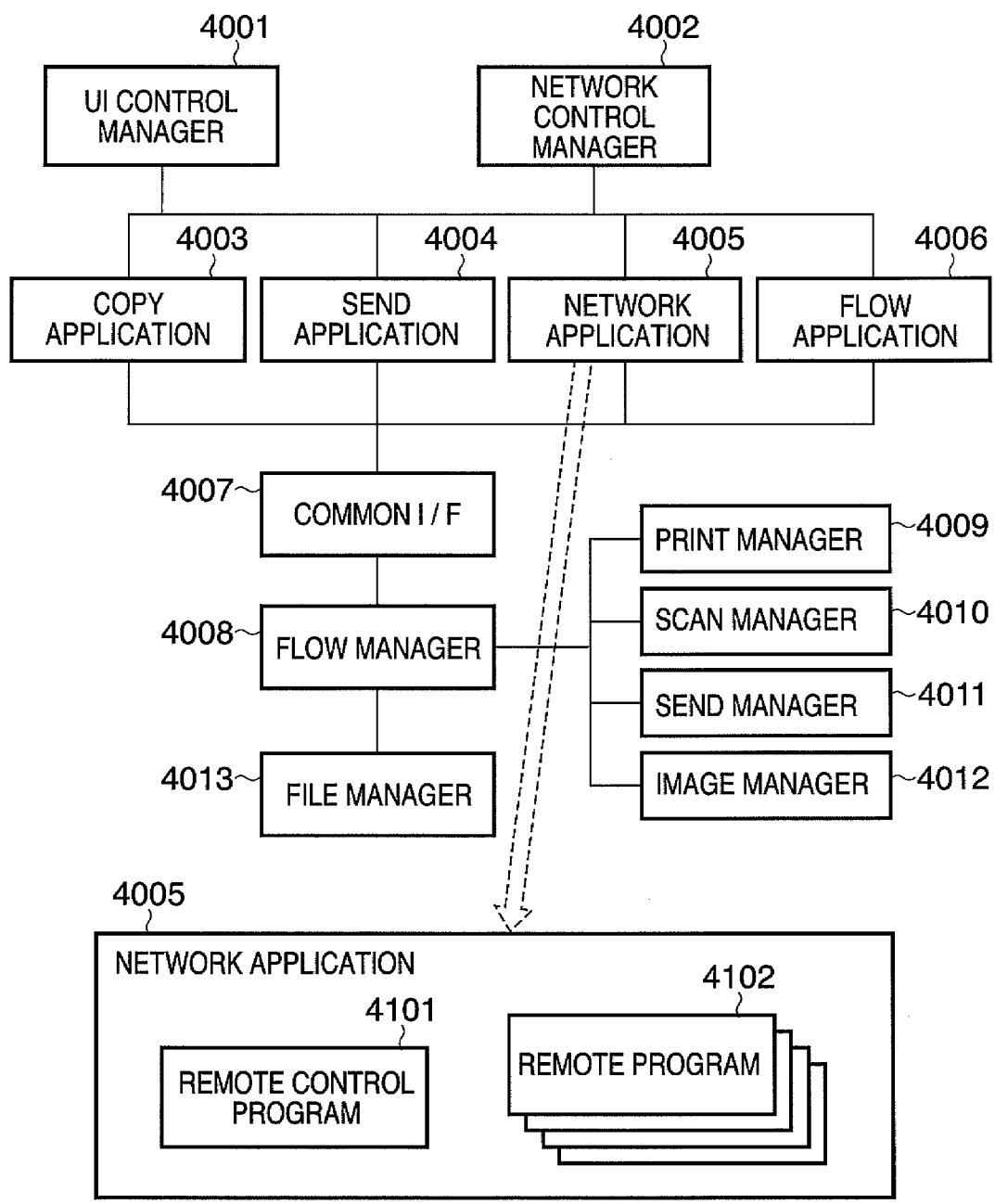
FIG. 4 is a block diagram showing the software configuration of the image forming apparatus according to the embodiment.

FIG. 4 is a block diagram showing the software configuration of the image forming apparatus according to this embodiment. Software programs with the configuration shown in FIG. 4 are stored in the HDD 2004 shown in FIG. 2.

A UI control manager 4001 is a UI manager which controls the console 2050, and makes control to transfer a user's instruction to lower-layer modules, and to display information from those modules on a UI of the console 2050. A network control manager 4002 receives instructions and information from the network, and sends instructions and information from the main unit 2000.

A copy application 4003 executes copy processing. A send application 4004 executes FAX send processing, mail send processing, and the like. A network application 4005 manages an application group which is accessible from an external network via the Web server 2009 described with reference to FIG. 2. The application group includes remote programs 4102 which allow users to remotely execute the processes of respective steps which form a flow, a remote control program 4101 which manages execution of the remote program 4102, and the like.

A flow application 4006 controls a device controller to execute a flow, which is defined in advance, in response to an instruction from a UI controller. Reference numeral 4007 denotes a common interface (common IF) which absorbs device-dependent settings and protocol differences. A flow manager 4008 organizes flow information received from the common interface 4007, and transfers it to control managers for lower-layer devices. The flow manager 4008 also executes an activation process, synchronization process, end process, and the like of the control managers according to the flow.

Furthermore, the flow manager 4008 processes the flow as a combination of a plurality of processes, which is sent from the flow application 4006.

Reference numeral 4013 denotes a file manager, which executes processing for saving and reading out image data used in the flow, intermediate data upon suspending the flow, and a flow file that defines details of the flow. The file manager 4013 also controls publication or the like of data saved in the HDD 2004 onto the network.

(Arrangement of Console 2050)

Figure 5:
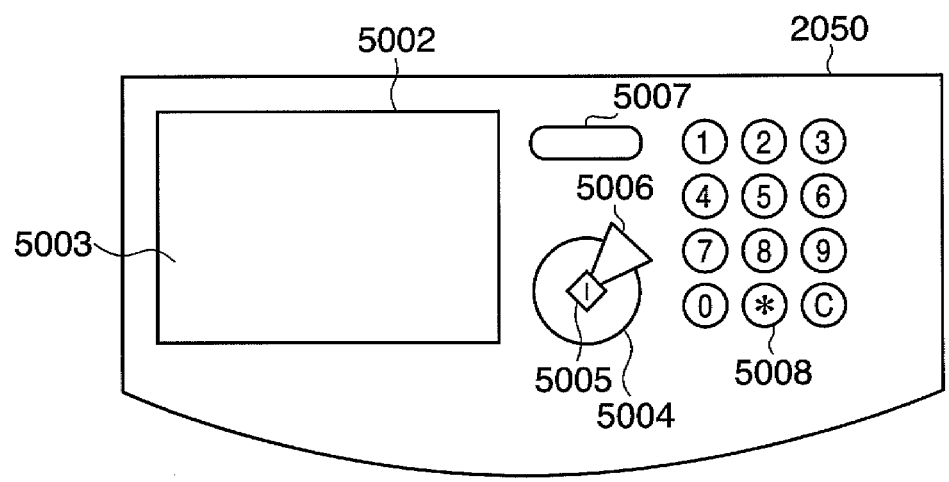
FIG. 5 shows the arrangement of a console 2050.

FIG. 5 shows the arrangement of the console 2050. An LCD display unit 5002 is prepared by adhering a touch panel sheet 5003 on an LCD, and displays the operation window of the system and software keys. When the user presses a certain displayed key, the LCD display unit 5002 informs the CPU 2001 of position information of that key.

A start key 5004 is used to start, for example, the scanning operation of an original image. The central portion of the start key 5004 includes a two-color LED 5005 (for example, green and red), which indicates depending on its color if the start key 5004 is ready to use. A stop key 5006 is used to stop the current operation. A reset key 5007 is used to initialize settings from the console. A numeric keypad 5008 is used to input a FAX number, the number of copies, and the like.

Figure 7:
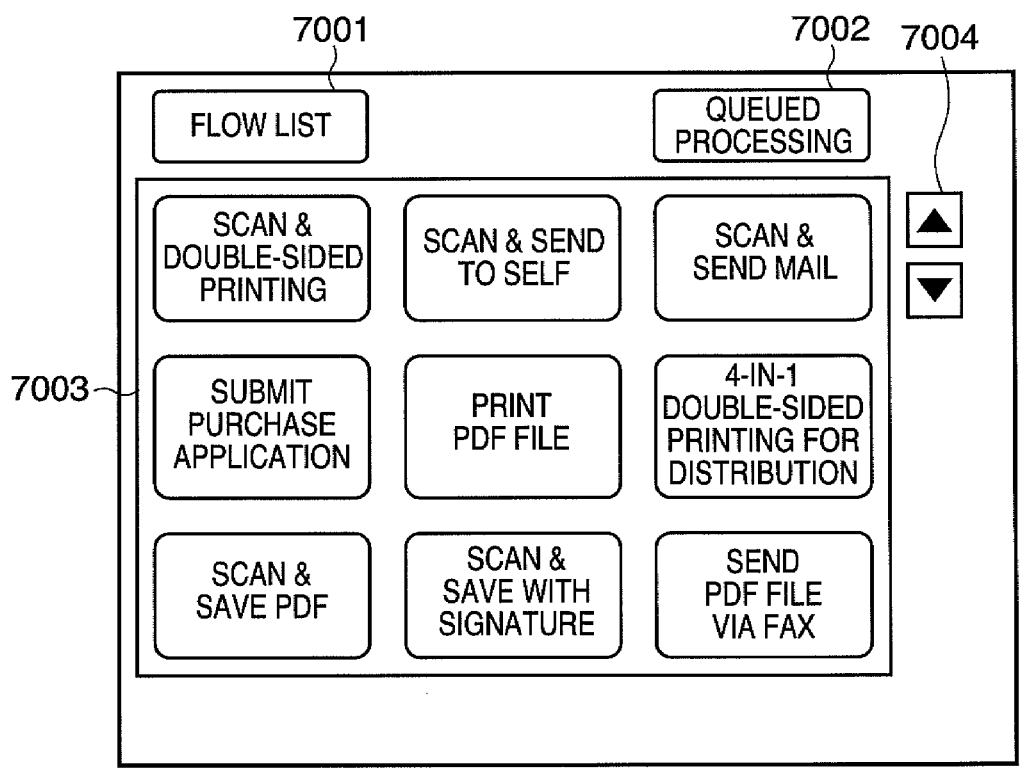
FIG. 7 shows a display example of a flow list window.

FIG. 7 shows the window configuration of a flow list displayed on the LCD display unit 5002 of the console 2050 by the flow application 4006. A list of flows is displayed as buttons on a button display area 7003, and the name of each flow is displayed on the corresponding button. The user can give an instruction to execute a desired flow by pressing the button on which the name of that flow is displayed. Upon pressing a flow list button 7001, all flows registered in the MFP 1002 are displayed on the button display area 7003. Details of a queued processing button 7002 will be described later. This button 7002 is used to display a list of flows each of which is suspended in a user's instruction waiting state in a certain step although execution of the flow is started in response to a user's instruction, and to call a window used to give the instruction for re-execution. Reference numeral 7004 denotes scroll buttons, which are used when not all buttons of flows are displayed on the button display area 7003.

Figure 9A:
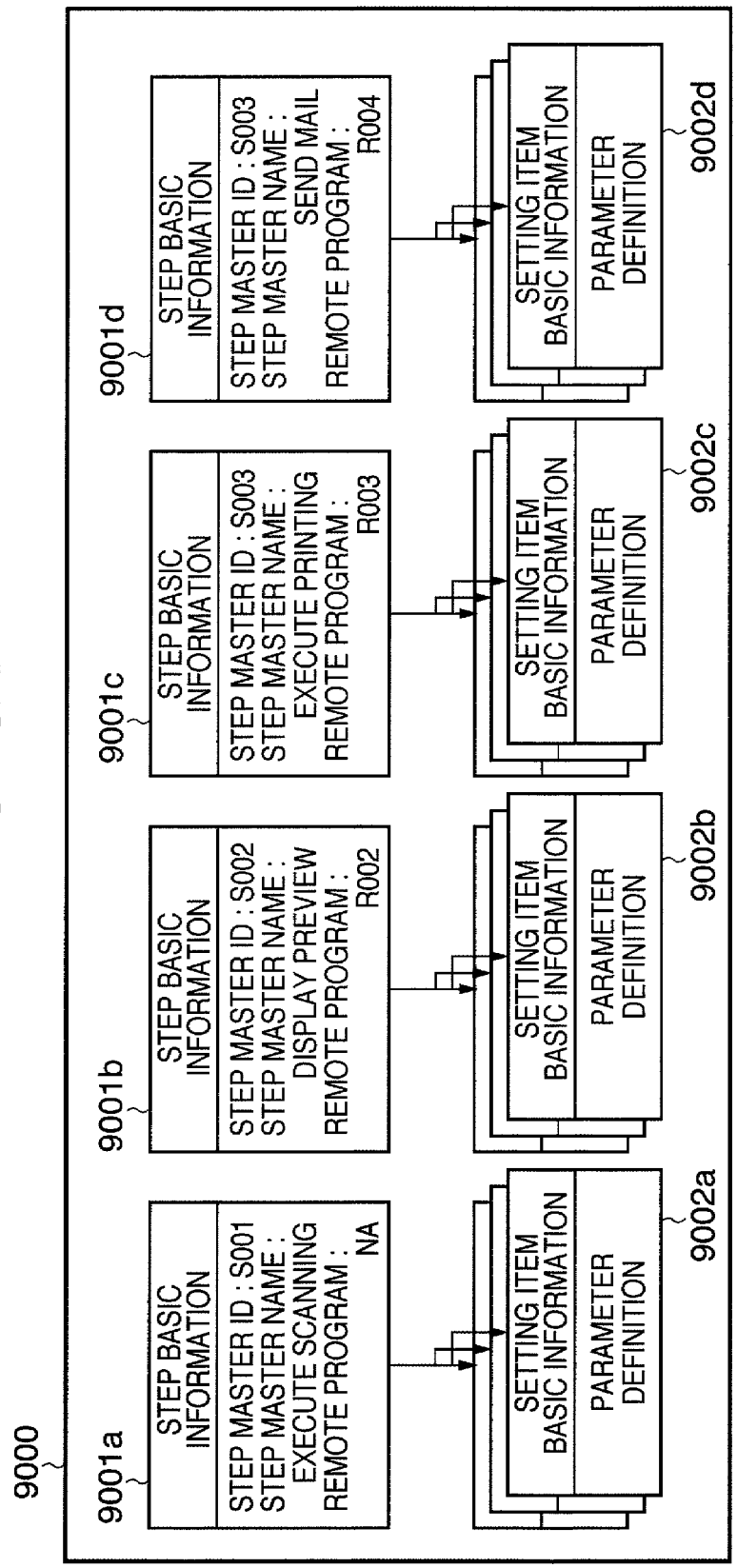
FIG. 9A is a view for explaining a step master 9000 as a template of step information which forms a flow.

FIG. 9A shows a step master 9000 as a template of step information which forms a flow. FIG. 9B shows a flow master 9100 which defines details of a flow and the configuration of steps of the flow. FIG. 9C shows a user master 9200 as user information of users who execute the flows. These pieces of information are saved in the HDD 2004 on the MFP 1002.

The step master 9000 defines information which is used as a template of a step which forms a flow. Each flow is defined by quoting the step information defined in this step master, and designating practical attribute information and the like. Reference numerals 9001*a* to 9001*d* in FIG. 9A denote examples of pieces of step basic information of the step master.

The pieces of step basic information 9001*a* to 9001*d* are uniquely identifiable by "step master IDs" included in attribute information. A "step master name" included in the attribute information is a name that represents the contents of that step. A "remote program" included in the attribute information is an ID that specifies a remote program corresponding to this step in the remote program group managed by the network application 4005 sown in FIG. 4. However, not all steps use the remote programs, as indicated by the step basic information 9001*a* of FIG. 9A.

Reference numerals 9002*a* to 9002*d* in FIG. 9A denote pieces of setting item basic information, each of which defines definition information of setting values which can be designated for each step. Each setting item basic information defines a parameter unique to a certain step, which is required upon execution of that step. By changing a parameter to be designated, the processing contents of the step can be controlled. If there are a plurality of setting items per step, a plurality of pieces of setting item basic information are associated, as shown in FIG. 9A.

Reference numeral 9100 in FIG. 9B denotes a flow master that defines information of a flow itself. Reference numeral 9101 denotes a flow object, which includes a flow ID and flow name as attribute information. The flow ID is an identifier used to uniquely identify the flow object. Reference numerals 9102*a* to 9102*c* denote step objects of steps which form the flow. A plurality of step objects 9102*a* to 9102*c* can be defined in association with one flow object 9101. The step objects 9102*a* to 9102*c* are generated based on the pieces of step basic information 9001*a* to 9001*d* of the aforementioned step master 9000. A step number (No.) of each step object is an identifier used to uniquely identify the step object in the flow object 9101. Each of the step objects 9102*a* to 9102*c* has pieces of attribute information "step ID", "setting change", and "remote instruction permission".

The "step ID" is information used to identify step basic information which is defined in the step master 9000 and is to be applied to that step, and corresponds to the step master ID of the step basic information 9001. The attribute information "setting change" designates whether or not to allow the user to change the value of a setting item detail object 9103 required to execute a certain step upon execution of the flow. The attribute information "remote instruction permission" indicates whether or not to permit processing of a certain step using a remote program when this step has the corresponding remote program. Note that whether or not a certain step has a remote program can be determined based on the setting value of the attribute information "remote program" of the step basic information 9001. If no remote program is available in a certain step, the attribute information "remote instruction permission" is always "NG". For example, a step indicated by the step object 9102*a* in FIG. 9B is set to have a step ID "S001". Hence, the step basic information to be applied to this step 9102*a* is the information 9001*a* in FIG. 9A. For this reason, in the step 9102*a*, "setting change" and "remote instruction permission" are "NG".

Reference numerals 9103*a* to 9103*c* denote setting item detail objects of respective steps. The setting item detail objects 9103*a* to 9103*c* hold parameters to be designated by this flow based on pieces of definition information defined by the pieces of setting item basic information 9002*a* to 9002*c*. If the attribute information "setting change" in each of the step objects 9102*a* to 9102*c* is "OK", the user can change the parameters designated in the setting item detail objects 9103*a* to 9103*c* upon execution of the flow.

The flow master 9100 can be created by a flow creation program which runs on the computer 1004 and notebook type computer 1006 connected to the MFP 1002 via the network. The created definition information is saved in the HDD 2004 of the MFP 1002 via the network. Of course, the MFP that executes the processing flow may comprise a flow creation program, and may create a processing flow in accordance with user's instructions.

Reference numeral 9200 in FIG. 9C denotes a user master. Reference numerals 9201*a* to 9201*c* denote user objects which represent pieces of user information. Each of the user objects 9201*a* to 9201*c* has pieces of attribute information "user ID (user identification information)", "password", "user name", "notification destination address", and the like. The attribute information "user ID (user identification information)" is an identifier used to uniquely identify each of the user objects 9201*a* to 9201*c*. The attribute information "password" is used in authentication when the corresponding user logs on the MFP 1002. The attribute information "user name" indicates the name of the user. The attribute information "notification destination address" indicates a notification destination where the user is notified of execution of the user object.

Figure 10:
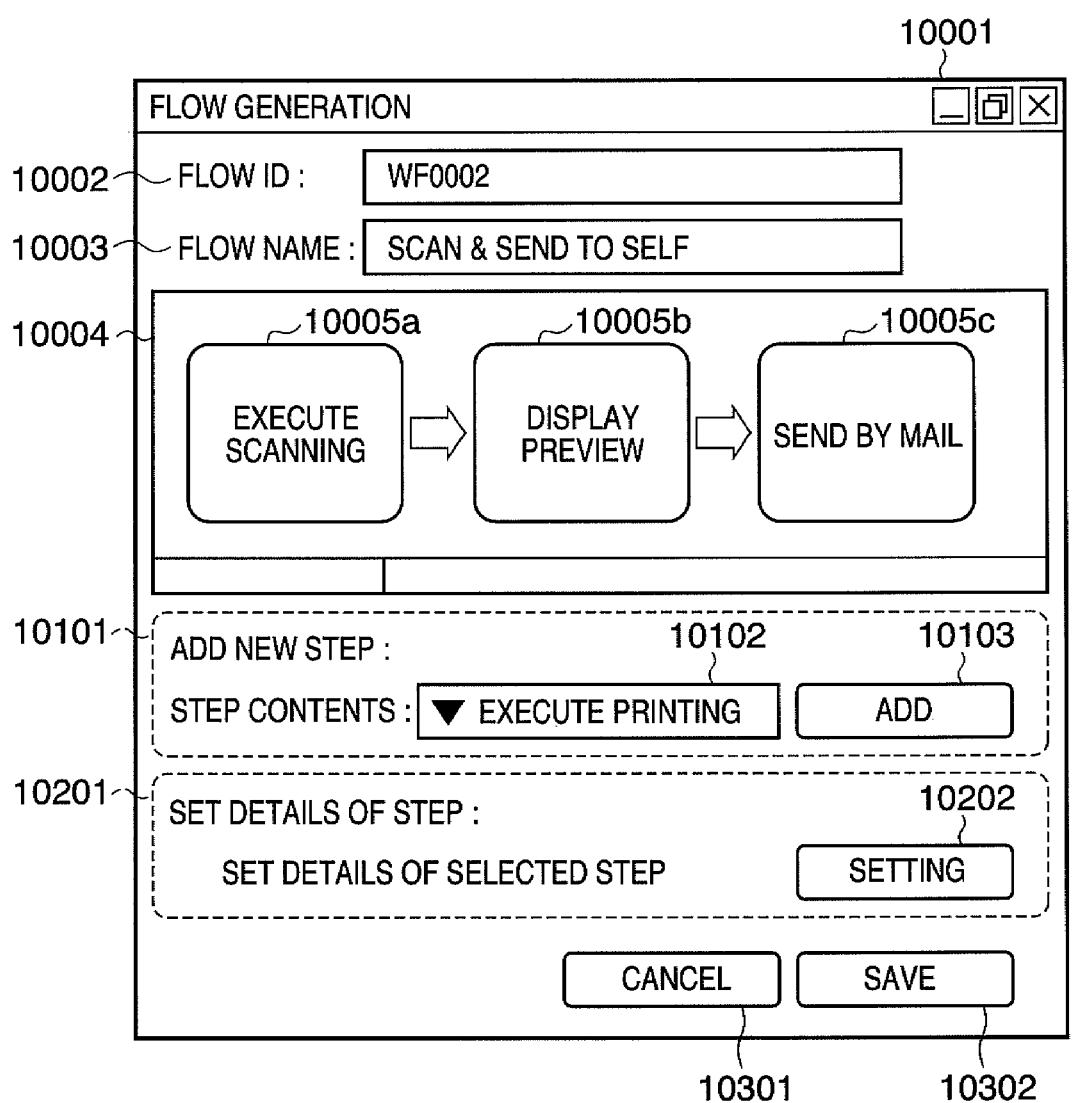
FIG. 10 shows a display example of a flow definition window.

FIG. 10 shows a flow definition window displayed by the flow creation application which creates information that defines the flow, as indicated by the flow object 9101, step objects 9102*a* to 9102*c*, and setting item detail objects 9103*a* to 9103*c* shown in FIG. 9B. The flow creation application can run on the computer 1004 or notebook type computer 1006 connected to the MFP 1002 via the network, and the created information is saved in the HDD 2004 in the MFP 1002.

A window 10001 is a principal window of the flow creation application. A flow ID 10002 displays attribute information (ID) that uniquely specifies the flow object 9101 which is being created. A flow name 10003 represents the flow name of the flow object 9101. Reference numeral 10004 denotes a flow configuration area, which defines the sequence of steps that form this flow. In the flow shown in FIG. 10, steps "execute scanning", "display preview", and "send by mail" are executed in turn. Reference numerals 10005*a* to 10005*c* denote steps which form this flow, and correspond to the step objects 9102*a* to 9102*c*. In FIG. 10, the second step 10005*b* is selected and highlighted.

Reference numeral 10101 denotes a new step addition area. A step designated in this area is added after the selected step 10005*b* in the flow configuration area 10004. Reference numeral 10102 denotes a field used to designate the contents of the step to be added. The step contents field 10102 displays a list of the pieces of step basic information 9001*a* to 9001*d* defined in the step master 9000 shown in FIG. 9A, and the user can select a step to be added from those displayed in the list. Reference numeral 10103 denotes an add button used to give the instruction to add the step selected in the step contents field 10102 to the flow. Upon pressing the add button 10103 in the state shown in FIG. 10, a step "execute printing" is added between the step "display preview" 10005*b* and the step "send by mail" 10005*c*.

Reference numeral 10201 denotes an area used to give the instruction to display another window for setting details of the step. Upon pressing a setting button 10202, another window for setting detailed information of the selected step in the flow configuration area 10004 is displayed.

A cancel button 10301 is used to cancel information set on the window of FIG. 10 and to end the flow operation. A save button 10302 is used to save information set on the window of FIG. 10 as the flow object, step objects, and setting item detail objects in the HDD 2004 of the MFP, and to end the flow operation.

FIG. 11 shows an example of a step edit window which is called upon pressing the setting button 10202 in FIG. 10 and is used to set detailed information of the step. The user sets the contents of the step objects 9102a to 9102c and setting item detail objects 9103a to 9103c shown in FIG. 9B using the step edit window. Reference numeral 11002 denotes a setting field used to set the flow ID that uniquely identifies the flow to which the step to be edited belongs. A flow name 11003 is a setting field used to set the name of the flow identified by the flow ID 11002. A step number (No.) 11004 is an identifier used to uniquely identify this step in the flow, and corresponds to the "step No." in each of the step objects 9102a to 9102c shown in FIG. 9B. Step contents 11005 correspond to the attribute information "step master name" in the step basic information 9001.

Reference numeral 11006 denotes a check box which corresponds to the setting of the attribute information "setting change" in each of the step objects 9102a to 9102c in FIG. 9B. If the check box 11006 is ON (checked), "setting change" is "OK"; if it is OFF (not checked), "setting change" is "NG". In FIG. 11, the check box 11006 is set to be OFF, and indicates that the user cannot change setting values designated in a setting item detail area 11007 upon execution of the flow.

The setting item detail area 11007 corresponds to the contents of each of the setting item detail objects 9103a to 9103c in FIG. 9B. The item contents of the setting item detail area 11007 vary depending on the step contents field 11005. Items to be included in the setting item detail area 11007 and values to be set in those items are defined in the pieces of setting item basic information 9002a to 9002c, and are displayed according to these pieces of information. For example, the setting item detail area 11007 in FIG. 11 includes an item "density" and options "light", "dark", "standard", and the like are prepared as a setting value that can be designated. These item and option are displayed based on the item "density" included in the pieces of setting item basic information 9002a to 9002c, and the contents of the options defined for that item. In FIG. 11, "dark" is selected as the item "density". The selected value is saved in the corresponding one of the setting item detail objects 9103a to 9103c as an initial value upon execution.

A step execution method area 11008 is used to designate whether or not execution of the step to be set is permitted using a remote program, and corresponds to the attribute information "remote instruction permission" in the step objects 9102a to 9102c in FIG. 9B. If this setting is ON, execution using the remote program is permitted; if it is OFF, execution using the remote program is inhibited.

In the example of FIG. 11, the step contents field 11005 is "execute scanning". The step "execute scanning" has a setting indicating that a remote program is not available in the attribute information "remote program" in the step basic information 9001a in FIG. 9A. Since this means that a remote instruction itself is not available, not only a check box of the step execution method area 11008 in FIG. 11 is set to be OFF (unchecked setting), but also the area 11008 itself is displayed in a hatched state so as not to change the setting itself.

Attribute information "permit remote instruction" in the step execution method area 11008 corresponds to the attribute information "remote instruction permission" in each of the step objects 9102a to 9102c. However, when no remote program is designated in the attribute information "remote program" in the aforementioned step basic information 9001a, the attribute information "remote instruction permission" is always OFF (=NG).

A cancel button 11010 is used to cancel the contents set on this window 11001 and to return to the previous window 10001. An OK button 11011 is used to save the contents set on this window 11001 as the step object 9102 and setting item detail object 9103 in the HDD 2004 of the MFP 1002, and to return to the previous window 10001.

Figure 12:
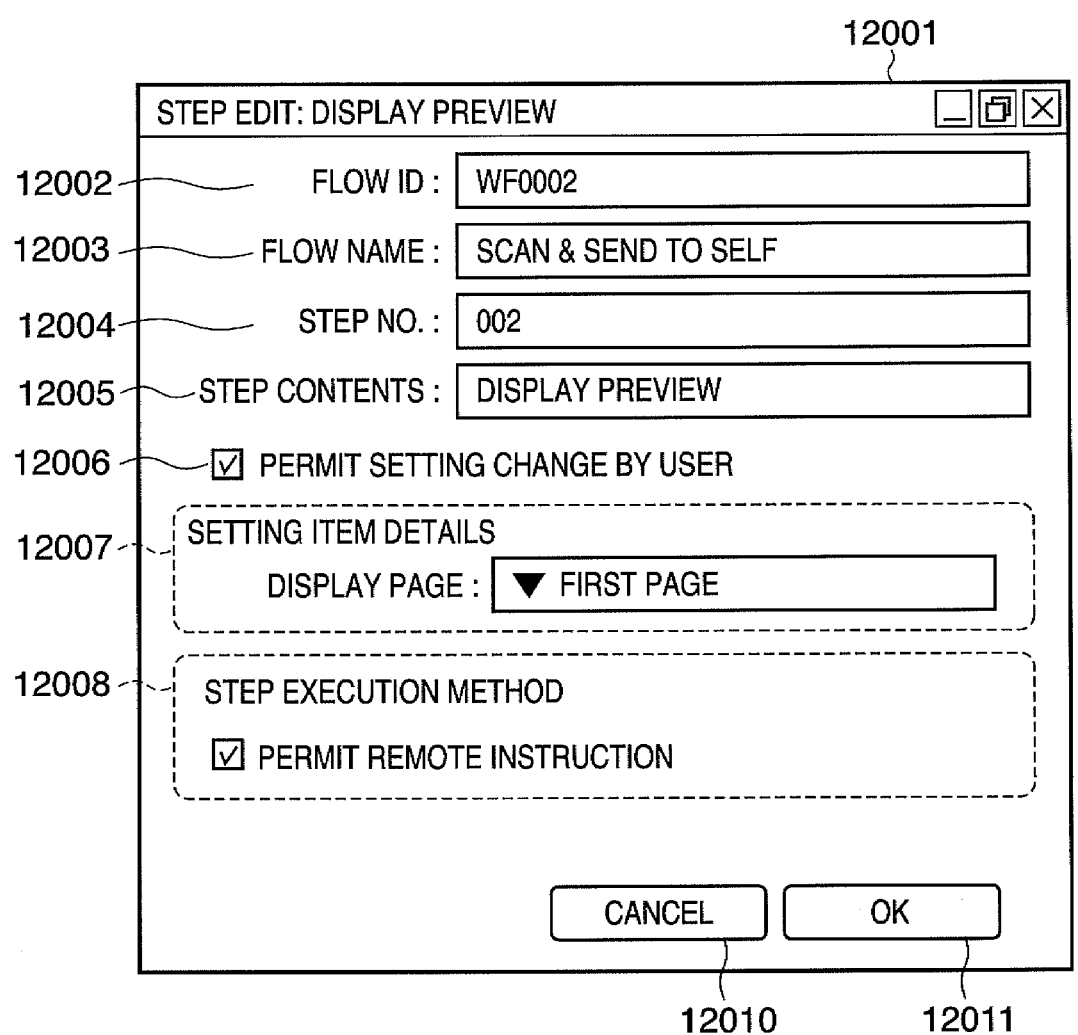
FIG. 12 shows an example of a step edit window used to set detailed information of a step.

FIG. 12 shows the same step edit window used to set detailed information of the step as in FIG. 11, but it shows an example when a step different from that in FIG. 11 is displayed. More specifically, although FIG. 11 has exemplified the step "execute scanning", FIG. 12 will exemplify the step "display preview".

Since the steps taken as examples are different, pieces of information to be displayed are different, but components 12001 to 12006 are the same as the components 11001 to 11006 in FIG. 11 in terms of their descriptions.

A setting item detail area 12007 is displayed based on different pieces of setting item basic information 9002a to 9002c since the step is different from that of the setting item detail area 11007. Hence, the number of items to be displayed and the contents of options are different, but the area 12007 is the same as the area 11007 in FIG. 11 in terms of its description.

The same applies to a step execution method area 12008. However, in the step basic information 9001b of the step "display preview", a remote program "R002" is designated in the attribute information "remote program". Therefore, a check box in the step execution method area 12008 is allowed to be set to ON or OFF. In FIG. 12, the check box "permit remote instruction" in the step execution method area 12008 is set to be ON. With this setting, the attribute information "remote instruction permission" in the corresponding step object 9102b is set to be "OK". This indicates that this step can be executed from the remote program.

Since a cancel button 12010 and OK button 12011 are the same as the cancel button 11010 and OK button 11011 in FIG. 11, a repetitive description thereof will be avoided.

The above description has revealed how to set and manage the flow object, that is, the flow definition. Details upon execution of the defined flow will be described below.

(Description about Execution of Flow)

Figure 13:
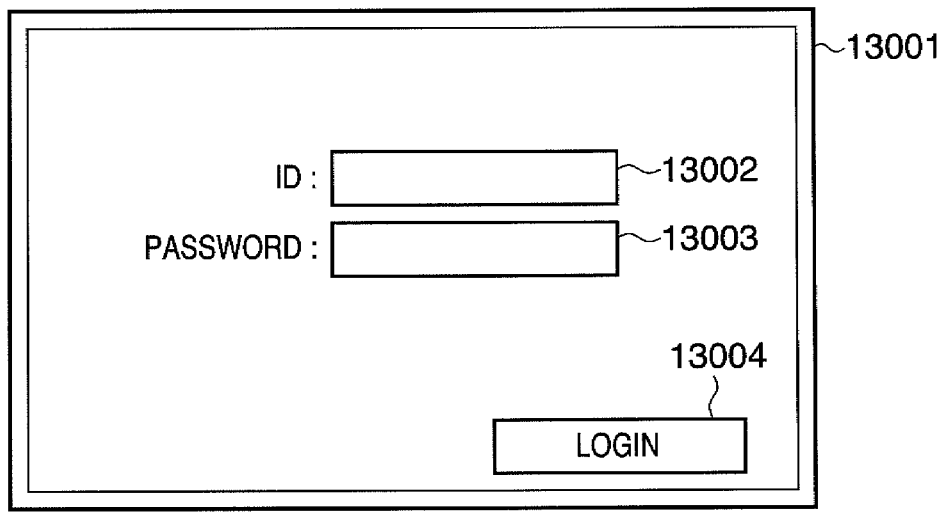
FIG. 13 shows an example of an authentication window.

The flow is normally executed from the MFP 1002. When the user begins to use the MFP 1002, the flow application 4006 initially displays an authentication window 13001 shown in FIG. 13. On the authentication window, reference numeral 13002 denotes an input field of a user ID; and 13003, an input field of a password. Upon pressing a login button 13004, the flow application 4006 executes authentication processing. The authentication processing collates whether or not user information that matches the input user ID and password is included the user master 9200 shown in FIG. 9C. If such user information is included, it is determined that the authentication has succeeded, and the flow application 4006 displays the flow list window shown in FIG. 7. The user can issue a flow execution start instruction by pressing the button of a desired flow displayed on the button display area 7003.

Details of processing upon execution of the flow by pressing the flow button displayed on the button display area 7003 in FIG. 7 will be described below.

This embodiment will exemplify a case in which the user has pressed a button corresponding to the flow ID=WF002 and the flow name "scan & send to self" exemplified in the flow object 9101 in FIG. 9B.

Figure 16:
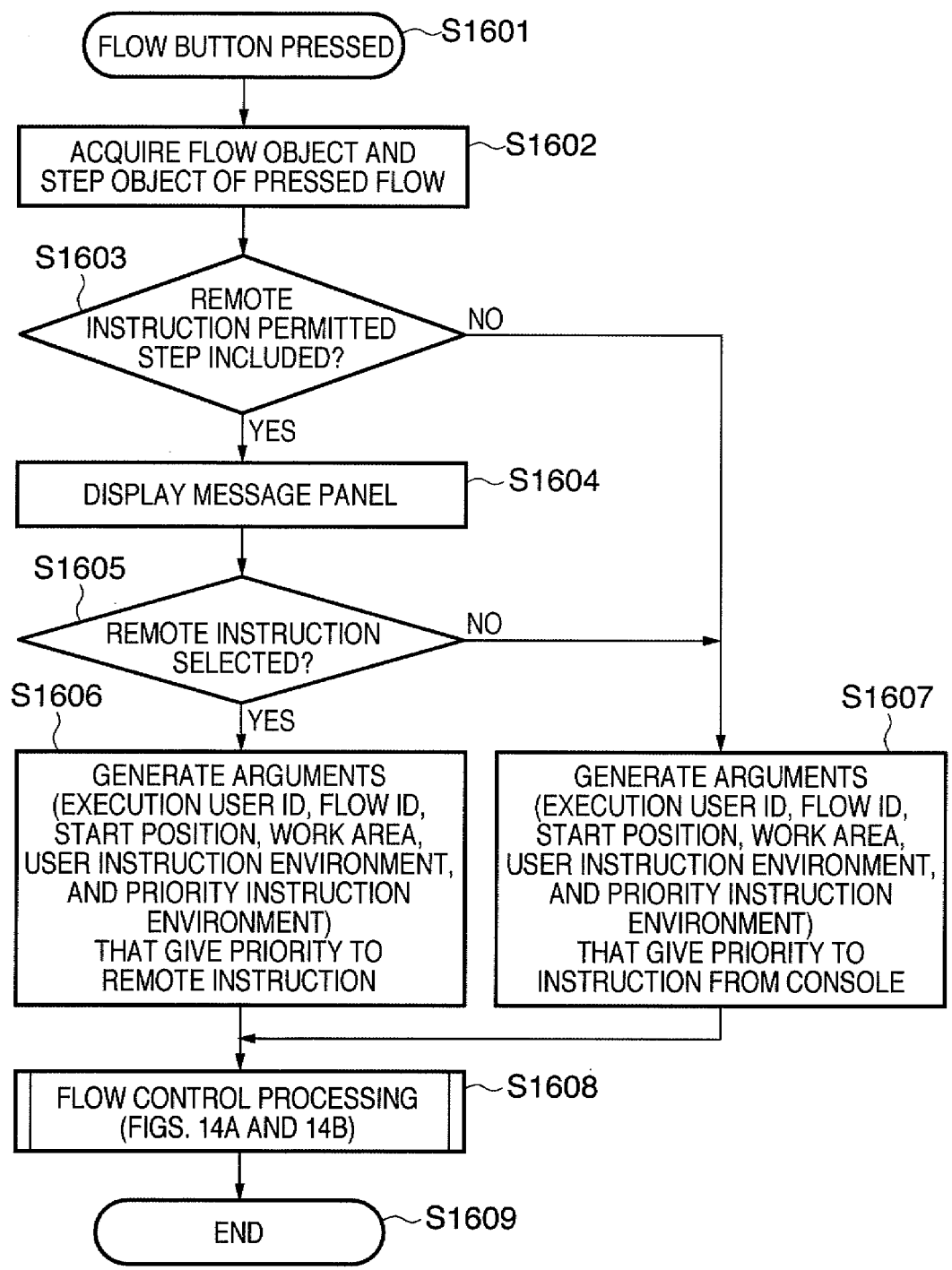
FIG. 16 is a flowchart for explaining the sequence of remote instruction checking processing.

Upon pressing the flow button, the flow application 4006 shown in FIG. 4 executes remote instruction checking processing shown in FIG. 16 prior to execution of the flow.

In step S1601, the flow application 4006 detects pressing of the flow button and starts processing.

In step S1602, the flow application 4006 acquires all step objects 9102a to 9102c under the flow object 9101 corresponding to the pressed button. For example, if the user has pressed the button "scan & send to self" with the flow ID=WF002, the flow application 4006 acquires step objects 9102a to 9102c. Furthermore, the flow application 4006 analyzes the acquired step objects to check if the flow includes any instruction required step that requires a user's instruction. More specifically, the flow application refers to the attribute information of each acquired step object, and determines a step object in which "setting change"="OK" is set as the instruction required step. The checking processing as to whether or not the instruction required step is included may be executed based on the contents of each step without referring to any attribute information. For example, as for steps that apparently require user's instructions such as a preview step, address input step, and the like, the flow application determines that the instruction required step is included without checking if the attribute information "setting change" is "OK".

The flow application 4006 checks in step S1603 if the step objects 9102a to 9102c acquired in step S1602 includes a remote instruction permitted step. More specifically, the flow application 4006 refers to the attribute information "setting change" and "remote instruction permission" in the step objects 9102a to 9102c. Then, the flow application 4006 checks if a step object in which "setting change"="OK" and "remote instruction permission"="OK is included. If such step is included (YES in S1603), the flow application 4006 determines that "a remote instruction permitted step is included", and the process advances to step S1604. If such step is not included (NO in S1603), the flow application 4006 determines that "a remote instruction permitted step is not included", and the process advances to step S1607. In the current example, since the step objects 9102b and 9102c correspond to "remote instruction permitted steps", the process of the flow application 4006 advances to step S1604.

Figure 6:
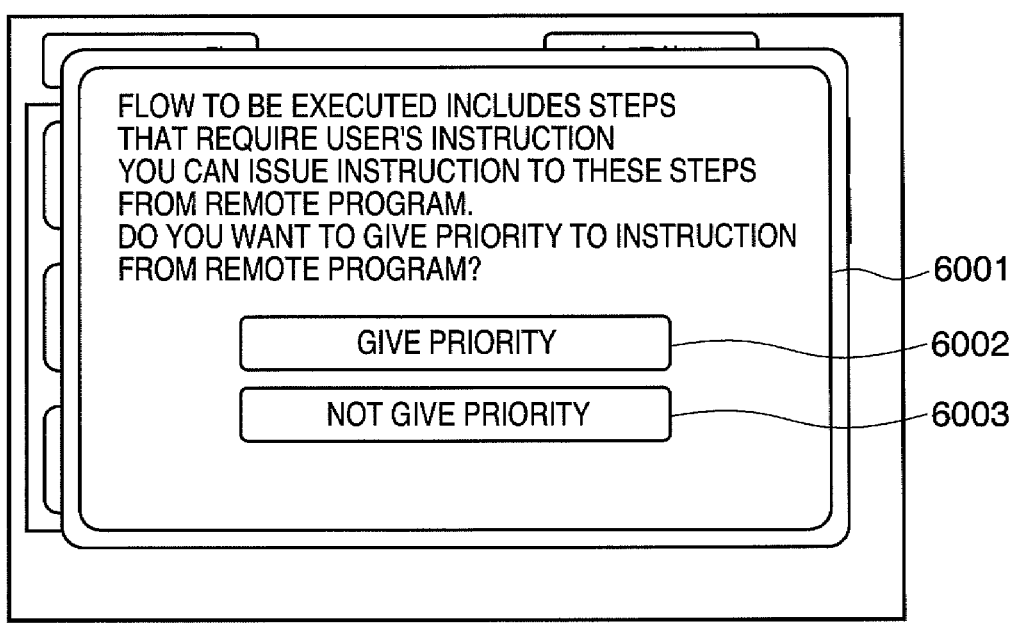
FIG. 6 shows a display example of a message panel.

In step S1604, the flow application 4006 displays a message panel shown in FIG. 6. Reference numeral 6001 denotes a message part. The message describes that the flow, execution of which the user has given the instruction for, includes steps that require user's instruction. The message also describes that since remote programs are available, the user can issue an instruction from a remote place upon processing the corresponding step. A remote instruction priority button 6002 is used when the user selects to give priority to an instruction from a remote place. More specifically, this means that the user issues an instruction to the corresponding step from the computer 1004 or notebook type computer 1006 connected to the MFP 1002 via the network 1001. A console instruction priority button 6003 is used to give priority to an instruction from the console 2050 of the MFP 1002. That is, the flow application 4006 selects a notification destination of information required to display an operation window used to accept a user's instruction in each instruction required step in accordance with the contents selected via the setting window shown in FIG. 6.

Note that the information required to display the operation window indicates an HTML that represents the operation window or a URL required to display the operation window. If the current flow to be processed includes a plurality of process required steps, the flow application 4006 may display the window shown in FIG. 6 a plurality of times. If the processing flow includes two process required steps, the flow application displays the window shown in FIG. 6 for the first process required step. After the user selects a place to issue an instruction via this window, the flow application displays the window in FIG. 6 again for the second process required step. In this way, the flow application 4006 selects for each process required step whether the user issues an instruction from the information processing apparatus connected via the network or from the console of the image forming apparatus. Therefore, the image forming apparatus can execute each process required step according to instruction contents input via the operation window displayed at the place of user's choice.

If the user presses either the remote instruction priority button 6002 or the console instruction priority button 6003, the process advances to step S1605. If the user presses the remote instruction priority button 6002, since he or she gives priority to a remote instruction, the flow application 4006 advances the process to step S1606. If the user presses the console instruction priority button 6003, the flow application 4006 advances the process to step S1607.

Steps S1606 and S1607 are those of generating arguments required upon activating the processing itself of the flow to be described later with reference to FIGS. 14A and 14B. Arguments assume some different values depending on whether the user gives priority to a remote instruction or an instruction from the console.

In step S1606, the flow application 4006 generates arguments when the user gives priority to a remote instruction. Arguments to be prepared include six different arguments "execution user ID", "flow ID", "start position", "work area", "user execution environment", and "priority instruction environment". The determination method of respective argument values will be described below.

An argument: "execution user ID" designates the user ID of the user who has authenticated in FIG. 13. If the authenticated user is a user of the user object 9201a, "U001" is designated.

An argument: "flow ID" is the flow ID of the flow object corresponding to the pressed button. In the current example, "WF002" is designated.

An argument: "start position" designates which of steps of the flow the processing starts. In this example, when the user presses the flow button to start processing, since the processing starts from the first step of the flow, the start position is "step No. 001".

An argument: "work area" means an area assured in the HDD 2004 so as to hold intermediate data obtained by converting a scan data file, an image format, and the like, which are generated during processing upon execution of the processing of this flow. For example, one directory may be created and assigned to the processing of the flow. In this case, the work area may be path information that designates the created directory. When the user activates the flow by pressing the flow button displayed on the button display area 7003, the flow application 4006 assures a new work area on the HDD 2004, and designates path information of that directory as the work area.

An argument: "user instruction environment" represents an environment in which the user gives the instruction to execute the flow, that is, if he or she inputs an instruction from the console 2050 of the MFP 1002 or from the apparatus other than the console 2050 using a remote program. When the user presses the flow button displayed on the button display area 7003, an argument indicating "console" is designated.

An argument: "priority instruction environment" designates a top priority instruction environment upon issuing an instruction to a step that requires some user's instruction (this step will be referred to as an instruction required step hereinafter). More specifically, whether the user gives priority to an instruction from the console 2050 or from the apparatus other than the console 2050 using a remote program is selected. When the user presses the flow button displayed on the button display area 7003, this argument is determined by the button pressed on the message panel shown in FIG. 6.

Since step S1606 corresponds to a case in which the user presses the remote instruction priority button 6002, an argument representing "remote instruction priority" is designated.

As for the process of step S1607, the arguments are generated in the same sequence as in step S1606 except that the value designated for the argument: "priority instruction environment" is different from that in step S1606. As the argument: "priority instruction environment", since step S1607 corresponds to a case in which the user presses the console instruction priority button 6003, an argument representing "console instruction priority" is designated.

With the aforementioned processing, for example, when the processing to be executed includes steps (process required steps) that require instructions by a plurality of users, whether the user issues an instruction from the information processing apparatus or from the console 2050 of the image forming apparatus can be selected for each process required step. Note that this selection may be managed using a priority order.

In this way, an environment convenient for the user can be selected for each process required step. Since the user can recognize instruction units used to input an instruction (the information processing apparatus or the console of the image forming apparatus) in advance, an instruction waiting window can be prevented from being untouched over a predetermined instruction waiting time period or longer after the window is displayed.

Alternatively, assume that the processing to be executed includes a plurality of process required steps (for example, first and second process required steps). The flow application 4006 selects the notification destination of an operation window used to accept a user's instruction to the first process required step in accordance with the contents selected via the window in FIG. 6. The flow application stores the priority order of the first process required step in the HDD 2004, and selects the notification destination of an operation window of the second process required step based on the notification destination selected for the first process required step. In this way, when a plurality of process required steps are included, the user need not repeat selection, thus improving the operability.

As a result, for example, since the user can input an instruction for the second process required step executed after the first process required step using the same instruction unit (the information processing apparatus or the console of the image forming apparatus) as the instruction input of the first process required step, the convenience for the user can be improved. Also, since the instruction input waiting time period can be shortened, the processing efficiency can be improved. For example, information leakage due to continuous display of highly confidential information for a predetermined period of time on the console 2050 can be prevented.

In step S1608, the flow application 4006 activates flow control processing for executing the processing of the actual flow using the arguments generated in this way. Upon completion of the flow control processing, the processing in FIG. 16 ends.

(Processing of Flow Application 4006)

The sequence of the processing of the flow (flow control processing) by the flow application 4006 will be described below with reference to FIGS. 14A and 14B.

In step S1401, this flow control processing is activated by designating the arguments generated in FIG. 16 above.

In step S1402, the flow application 4006 acquires a flow object (the object 9101 in FIG. 9B) based on the flow ID ("WF002" in the current example) designated as the argument in step S1401. As a result, the flow application 4006 can recognize the processing contents of the flow by analyzing step objects associated with the acquired flow object. For example, the flow application 4006 can determine step objects which form the flow.

The flow application 4006 checks in step S1403 based on the start position of the argument if steps to be processed still remain in the flow. If the argument of the start position is "step No. 001", since it is the first step of the flow ID="WF002", the flow application 4006 determines that steps to be processed still remain. In this case, the process advances to step S1405.

On the other hand, if the start position is "step No. 004", since there is no step to be processed, the process advances to step S1404, thus ending the flow processing.

In step S1405, the flow application 4006 notifies the notification destination selected by the processing in FIG. 16 of an operation window used to accept an instruction to the instruction required step. More specifically, the flow application 4006 refers to the argument: "priority instruction environment" designated as those in step S1401, and if "console instruction priority" is designated (YES in S1405), the process advances to step S1406. If "remote instruction priority" is designated (NO in S1405), the process advances to step S1413.

In step S1406, the flow application 4006 starts the processing of a step designated at the current start position. More specifically, the flow application 4006 issues an appropriate instruction to the common IF 4007 in accordance with the contents of the step designated as the start position. For example, if the attribute information "setting change" of one of the step objects 9102a to 9102c corresponding to the step which is being processed is "NG", the flow application 4006 passes values designated in the setting item detail objects 9103a to 9103c to the common IF 4007. Then, the flow application 4006 instructs the common IF 4007 to execute the processing of the step designated as the start position.

On the other hand, if the attribute information "setting change" of the corresponding one of the step objects 9102a to 9102c is "OK", the flow application 4006 sets values designated in the setting item detail objects 9103a to 9103c as initial values. Then, the flow application 4006 instructs the common IF 4007 to display a window used to accept a step execution instruction from the user.

Figure 15:
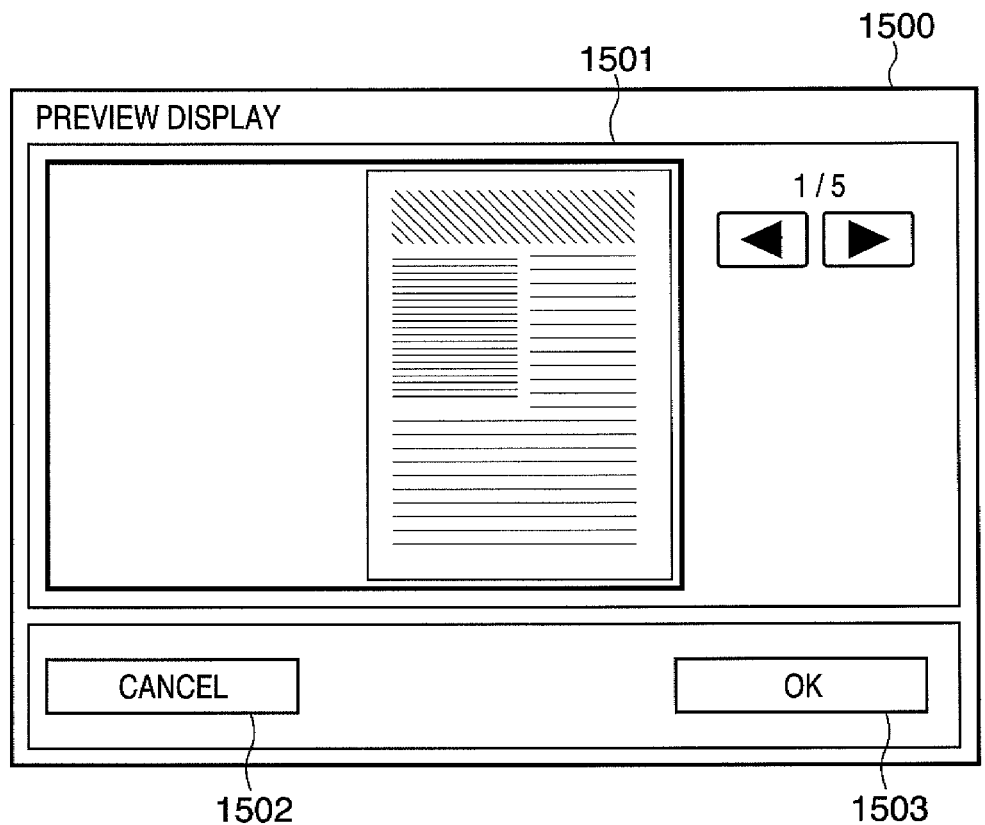
FIG. 15 shows a window display example of a "display preview" step.

FIG. 15 exemplifies a window to be displayed in the step "display preview" of "step No. 002" as an example of a window used to accept a step execution instruction from the user.

Reference numeral 1500 in FIG. 15 denotes a preview display window. Reference numeral 1501 denotes a detail display area which includes a preview display area, page change buttons used to change the page position to be previewed, and the like. The configuration of display items and the like of detail display area 1501 changes depending on steps. Reference numeral 1502 denotes a cancel button. Reference numeral 1503 denotes an OK button. The cancel button 1502 and OK button 1503 are instruction buttons which are always displayed irrespective of steps. The cancel button 1502 is used to cancel the processing of this step, and to cancel that of the flow itself. The OK button 1503 is used to end the processing of this step, and to instruct to proceed with the processing of other steps.

At the display timing of this window, the step enters a "user's instruction waiting state" that waits for an input from the user. If the user presses the cancel button 1502 or OK button 1503, the preview display window 1500 is closed, and the "user's instruction waiting state" is canceled, thus restarting the processing of the step.

In step S1407, the flow application 4006 monitors the processing state of the step, execution of which has been instructed in step S1406 via the common IF 4007, and if the processing of that step is complete, the process advances to step S1408.

On the other hand, if the processing of the step is not complete yet, the process advances to step S1409. The processing of the step is not complete yet when the processing itself of the step requires a very long period of time or when the step that requires a user's instruction is processed, and is waiting for a user's instruction.

For example, when the flow="WF002" is processed, and the start position is "step No. 002", the flow application 4006 displays the aforementioned window shown in FIG. 15 to wait for a user's instruction. In this case as well, if it takes time until a user's instruction is input, the flow application 4006 determines in step S1407 that the processing is not complete yet, and the process advances to step S1409.

Step S1408 is processing executed if the flow application 4006 determines in step S1407 that the processing of the step is complete. In step S1408, the flow application 4006 shifts the start position (start step) by one to advance to the next step of the flow. For example, if the current start position is "step No. 001", the flow application 4006 shifts the step by one to re-set "step No. 002" as a start position (start step). Upon completion of shifting of the start position, the process returns to step S1403 to check if the steps to be processed still remain, as described above. Then, the processing of the flow advances in turn to that of the next step.

If the step executed in step S1406 requires displaying the window for accepting a user's instruction shown in FIG. 15, the flow application 4006 checks in step S1409 if the user presses the cancel button 1502. If the user presses the cancel button 1502, the flow application 4006 deletes intermediate data and the like created in the area designated by the argument "work area" in step S1401, and the process advances to step S1410 to end the flow.

On the other hand, if the user does not press the cancel button 1502, the process advances to step S1411.

The flow application checks in step S1411 if the step started in step S1406 is an instruction required step that requires a user's instruction shown in FIG. 15. If the flow application 4006 determines that the step is an instruction required step, it monitors if the step is in a user's instruction waiting state. If the step is not in a user's instruction waiting state, since this means that it takes time to process that step, the process returns to step S1407 to check again if the step is complete.

If the step is in a user's instruction waiting state, the process advances to step S1412. Since the flow application determines in previous step S1411 that the step is in the user's instruction waiting state, it checks in step S1412 how long the user's instruction waiting state continues. In other words, the flow application 4006 measures an elapsed time period, that is, how long a state in which the user does not make any input continues. The flow application 4006 can measure the elapsed time period, that is, how long a state in which the user does not make any input continues, with reference to a timer that serves as a time measuring unit.

The user confirms the contents and sets values while observing the contents of the detail display area 1501 shown in FIG. 15. If the user sets an arbitrary value, such operation is determined as a user's input, and the elapsed time period is temporarily reset to "0". However, an elapsed time period is measured again until the user makes the next input. In this manner, the measurement of an elapsed time period is repeated until the user presses the cancel button 1502 or the OK button 1503 to close the window. The long elapsed time period means that the user does not make any operation to the window although the window is displayed. Furthermore, in some cases, the user may not notice display of the window shown in FIG. 15, and may have already moved away from the MFP 1002. For example, the flow application 4006 checks using the timer if a predetermined time period T (e.g., 60 sec) has exceeded. Note that the elapsed time period can be arbitrarily set.

If the elapsed time period T has not exceeded the predetermined time period (e.g., 60 sec), the process returns to step S1411 to repeat checking. If the elapsed time period has exceeded 60 sec, the process advances to step S1416. That is, if the user does not input any instruction within the predetermined time period after the window shown in FIG. 15 is displayed, the flow application 4006 sets the processing of the step that requires a user's instruction in a suspended state, and the process advances to step S1416.

In this embodiment, the elapsed time period is exemplified as 60 sec. However, the elapsed time period value may be longer or shorter than 60 sec. That is, the elapsed time period may be arbitrarily set or changed depending on the use environment or circumstance. As attribute information of the step object, "elapsed time period" may be added, and a threshold of the elapsed time period may be changed for each step.

The processing executed when it is determined in step S1405 that the priority instruction environment is not the console will be described below. In step S1413, the flow application 4006 refers to the attribute information "setting change" set in the corresponding one of the step objects 9102*a* to 9102*c* specified by the arguments "flow ID" and "start position".

If the attribute information "setting change" is "NG", the process advances to step S1414. When the attribute information "setting change" is "NG", this means that no user's instruction is required upon execution of that step. Hence, the flow application 4006 executes the processing of the step designated as the start position. This processing is the same as that when the flow was executed from the console 2050 previously, that is, the processing corresponding to step S1406. Upon completion of the processing of the step, the process advances to step S1415.

The flow application 4006 shifts the step No. designated as the start position to the next step in step S1415, and the process returns to step S1403. If the steps that do not require any user's instruction continue, that is, if the steps in which the attribute information "setting change" is "NG" continue, the steps are processed in turn.

Conversely, if the attribute information "setting change" is "OK" in step S1413, the processing of that step cannot be executed unless a user's instruction is received. However, when the process reaches such step, the user selects to give priority to the processing method using the remote program 4102 for that step. Hence, the process advances to step S1416 without executing the processing of the step.

The process reaches step S1416 in either of the following two cases.

In the first case, although the step requires a user's instruction, a user's instruction waiting state continues over the predetermined time period without any user's instruction in step S1412, and it is determined that the user is not near the MFP 1002. In the second case, in step S1413, the step that requires a user's instruction is to be processed, and the user designates "remote instruction priority" using the remote program as the priority instruction environment.

In step S1416, the flow application 4006 interrupts the processing of the flow, and generates suspend information shown in FIG. 17, thus setting the processing in a suspended state.

FIG. 17 shows an example of information to be held (suspend information) upon interruption of the processing. The suspend information is stored in the HDD 2004 in the MFP 1002. The storage format of the suspend information may be a text file or that information may be stored in a database such as a relational database. Suspend information 1701 includes a plurality of data items.

A data item 1711 is "suspend ID". The suspend ID is an identifier used to uniquely identify specific suspend information in the suspend information 1701.

A data item 1712 is "flow ID". This flow ID is used to specify the flow whose processing is suspended to generate the suspend information. The flow ID value of the flow object 9101 corresponding to the suspended processing is stored in this data item. For example, in case of FIG. 9B, ID=WF002 is stored.

A data item 1713 is "step number (No.)". The step No. of one of the step objects 9102a to 9102c corresponding to the step which is being processed upon suspending the processing is stored in this data item. For example, when the processing is suspended in the second step of FIG. 9B, step No. 002 is stored.

A data item 1714 is "work area". This data item stores the argument "work data" designated as those upon execution of the processing in step S1401 in the flowchart of FIG. 14A.

A data item 1715 is information used to specify a flow execution user. This data item stores the argument "execution user ID" designated in step S1401.

In step S1416, the flow application 4006 generates the suspend information shown in FIG. 17 to suspend the processing of the flow, and the process advances to step S1417.

The flow application 4006 checks in step S1417 if the suspended processing can be restarted from the remote program. More specifically, the flow application 4006 implements this checking process with reference to the attribute information "remote instruction permission" of the step object 9102 corresponding to the suspended step, and the attribute information "remote program" of the step basic information 9001 corresponding to the step object 9102.

If the attribute information "remote instruction permission" is "OK" and the remote program is designated in the attribute information "remote program", the flow application 4006 determines that the processing can be restarted from the remote program, and the process advances to step S1418. Otherwise, the flow application 4006 determines that the processing cannot be restarted from the remote program, and the process advances to step S1420, thus ending the flow control processing.

For example, in case of the step object 9102b, the attribute information "remote instruction permission" is designated with the value "OK". Also, a remote program "R002" is designated in the attribute information "remote program" of the corresponding step basic information 9001b. In this case, the flow application 4006 determines that the processing can be restarted from the remote program, and the process advances to step S1418.

On the other hand, NO is determined in step S1417 when the attribute information "remote instruction permission" is designated with the value "NG" or when no remote program is defined in the attribute information "remote program". That is, the flow includes the step that requires a user's instruction, but no remote program is prepared for that step. In such case, the flow application cannot restart the processing of the suspended step using the remote program, and the process advances to step S1420 without any special notification, thus ending the processing.

The method of restarting the suspended processing will be explained later in a description of a queued processing list window shown in FIG. 23.

The flow application 4006 checks in step S1418 if a user's address to which a notification message indicating that the flow is suspended is registered. More specifically, the flow application 4006 checks with reference to the attribute information "notification address" in the corresponding one of the user objects 9201a to 9201c if the address is set for the flow execution user 1715 written out in the suspend information 1701 in step S1416.

If no address is set, the process advances to step S1420, thus ending the flow control processing. On the other hand, if the address is set, the process advances to step S1419. This embodiment uses a mail address as the notification method to the user. However, notification methods other than e-mail may be used.

In step S1419, the flow application 4006 notifies, based on the mail address, an address (URL) required when the user issues a restart instruction of the suspended flow processing from the computer 1004 or notebook type computer 1006 connected via the network 1001.

More specifically, the flow application 4006 notifies a remote control program access address (URL) required to execute the remote control program 4101 in the network application 4005 shown in FIG. 4 via the Web server 2009. In addition, the flow application 4006 adds, to the address, the suspend ID (suspend identification information) 1711 used to uniquely identify the suspend information 1701 output in step S1416 as an argument upon activating the remote control program. The flow application 4006 generates a remote control program access address (URL) with the suspend information 1701 as an argument, and sends an e-mail message that describes the generated URL to the mail address of the user acquired in step S1419, thus ending the processing.

Figure 14A:
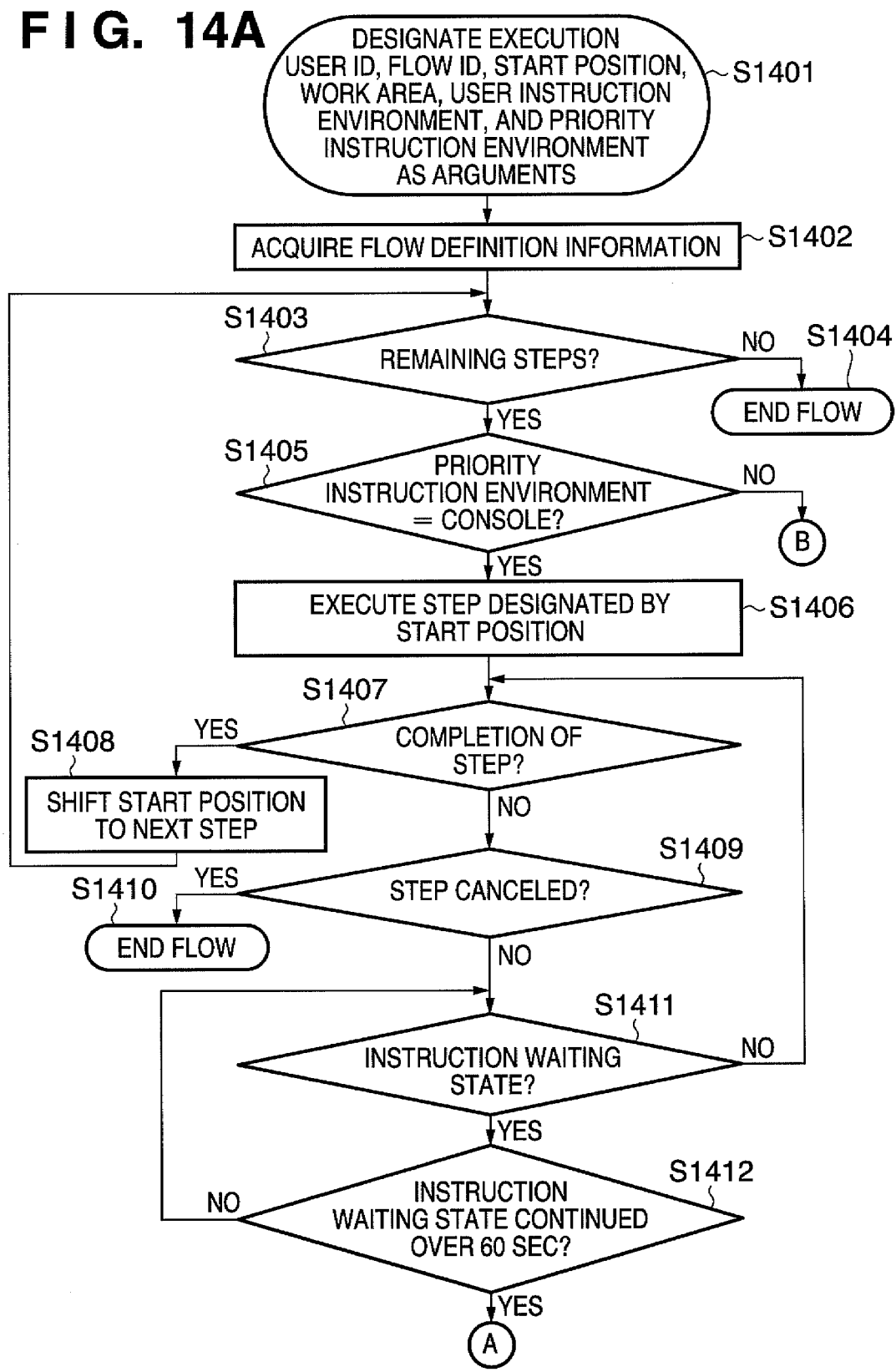
FIGS. 14A and 14B are flowcharts for explaining the sequence of flow control processing.
Figure 14B:
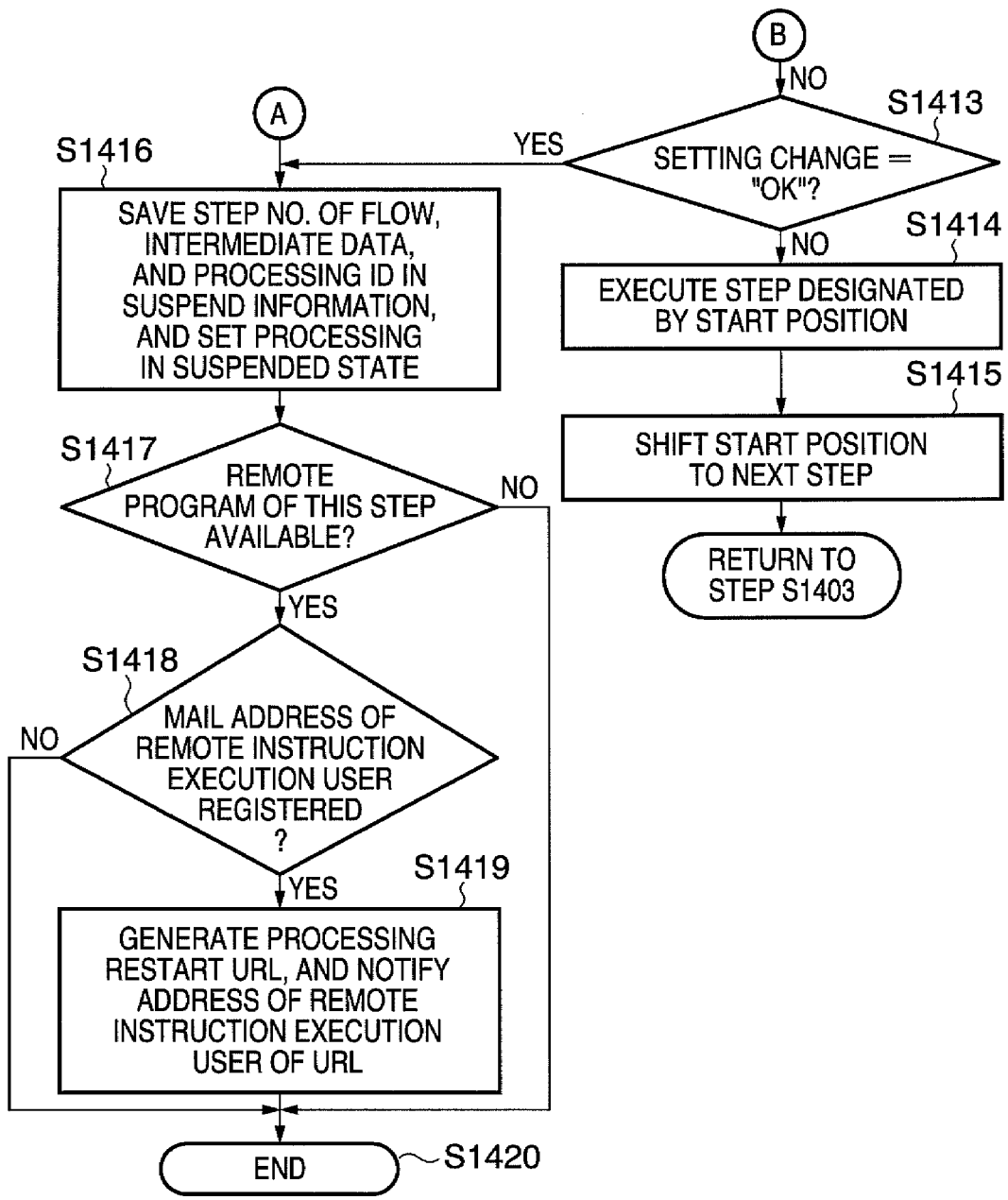

With the processing shown in FIGS. 14A and 14B, since the processing of the instruction required step that requires a user's instruction is executed in response to an instruction input at the place of user's choice, a probability of leaving the processing untouched in a user's instruction waiting state can be eliminated.

(Flow Processing Restart Sequence)

The restart sequence of the suspended flow processing will be described below. In step S1420 in FIG. 14B, the flow application 4006 sends the remote control program access address (URL) that designates the suspend ID 1711 as an argument to the flow execution user. The user can acquire the remote control program access address (URL) as long as he or she can receive e-mail. The user who acquired the remote control program access address (URL) via e-mail can establish connection to this remote control program access address using a Web browser from the computer 1004 or notebook type computer 1006 shown in FIG. 1.

Figure 18:
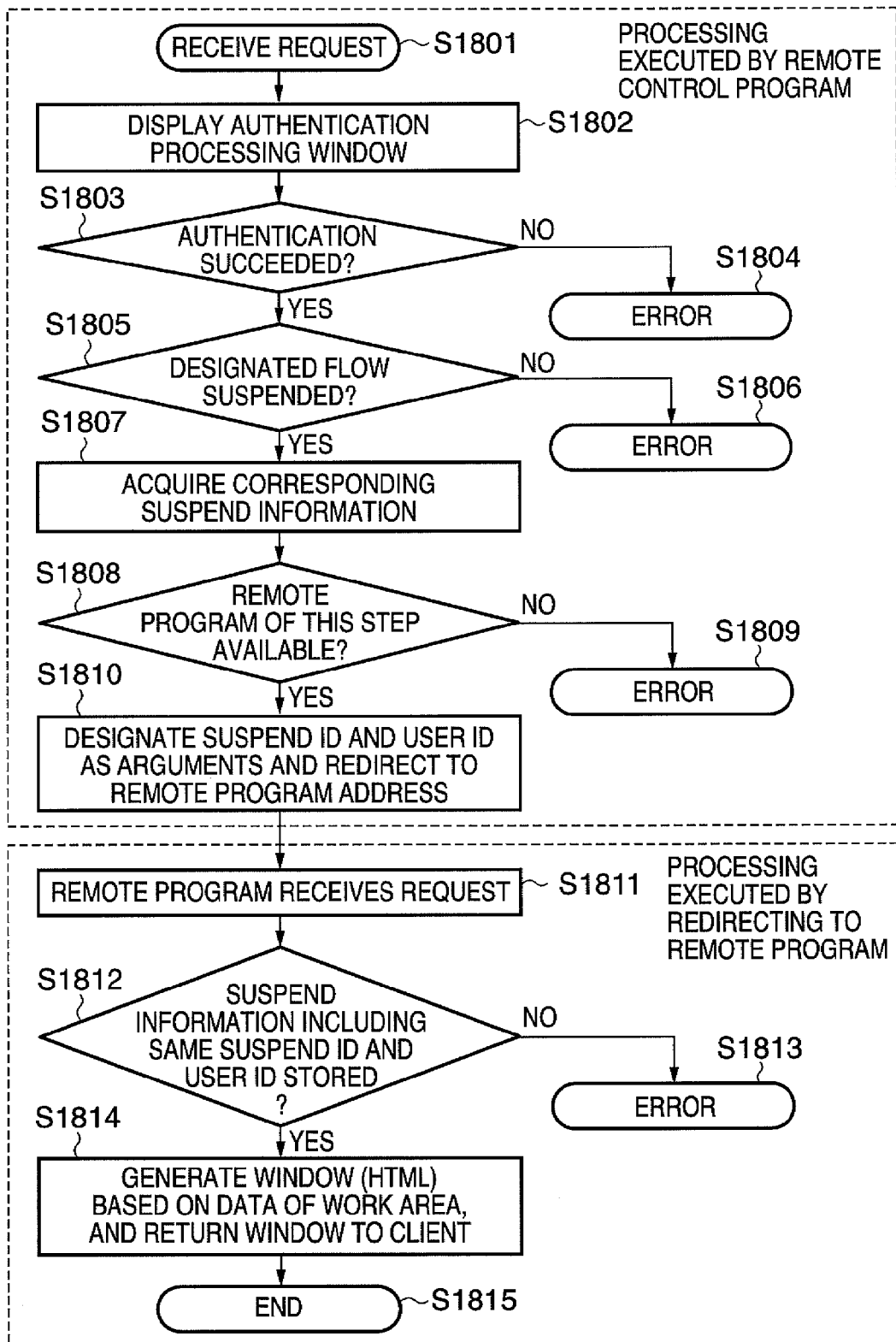
FIG. 18 is a flowchart for explaining the sequence of processing of a remote control program.

Upon reception of a request from the browser, the Web server 2009 launches the remote control program 4101 in the network application 4005 designated by the remote control program access address, and executes processing shown in FIG. 18.

In step S1801, the remote control program 4101 receives a request from the browser. In this case, the remote control program 4101 acquires the suspend ID designated as an argument at the same time.

The remote control program 4101 returns HTML data of an authentication processing window to the browser in step S1802. The browser displays an authentication processing window on it based on the received HTML data. FIG. 19 shows an example of the authentication processing window.

Reference numeral 1900 denotes a window of the browser that displays the authentication processing window. Reference numeral 1901 denotes a user ID input field. The user inputs the value corresponding to the attribute information "user ID" in one of the user objects 9201a to 9201c shown in FIG. 9C in this field. Reference numeral 1902 denotes a password input field. The user inputs the value corresponding to the attribute information "password" in one of the user objects 9201a to 9201c shown in FIG. 9C in this field. Reference numeral 1903 denotes a login button. The HTML that configures the authentication processing window shown in FIG. 19 notifies the remote control program 4101 of the values input to the user ID input field 1901 and password input field 1902 upon pressing of the login button 1903. The remote control program 4101 processes step S1803 using the notified values.

The remote control program 4101 checks in step S1803 based on the notified user ID and password if the user master 9200 includes a user object that matches these two values. If no user object is found, the process advances to step S1804 as an authentication failure, and the remote control program 4101 sends HTML data that displays an error message to the browser, thus ending the processing.

If a user object that matches the two values is found, the remote control program 4101 stores the user ID of that user object as a flow restart user, and the process advances to step S1805 as an authentication success. In step S1805, the remote control program 4101 searches the suspend information 1701 to specify suspend information which includes the suspend ID 1711 and flow execution user 1715 that match the suspend ID designated as an argument in step S1801 and the user ID stored in step S1803. If no data that matches these values is found, the remote control program 4101 determines that the designated flow is not suspended. Then, the process advances to step S1806, and the remote control program 4101 sends HTML data that displays an error message to the browser, thus ending the processing. In this case, since there is no suspend information, the processing cannot be restarted.

If the data that matches the values is specified in step S1805, the process advances to step S1807. For example, if the suspend ID designated as an argument is "001", and the user ID of the flow restart user is "U001", data 1721-1 in FIG. 17 corresponds to the suspend information to be specified.

In step S1807, the remote control program 4101 acquires data 1721-N of the suspend information which matches the suspend ID 1711 and flow execution user 1715 in step S1805, and the process advances to step S1808.

In step S1808, the remote control program 4101 refers to the flow ID 1712 and step No. 1713 in the acquired data 1721-1. As a result, the remote control program 4101 can specify the flow object 9101 corresponding to the flow to be restarted, and the step object 9102 corresponding to the step as a start point of restart. If the step object 9102 can be specified, the corresponding step basic information 9001 can be specified based on the attribute information "step ID". If the step basic information 9001 can be specified, whether or not the remote program available for this step is designated can be checked based on the attribute information "remote program". If the remote program is designated, the process advances to step S1810. If no remote program is designated, since the flow processing cannot be remotely restarted via the network application 4005, the process advances to step S1809. In step S1809, the remote control program sends HTML data that displays an error message to the browser, thus ending the processing.

For example, if the acquired suspend information is the data 1721-1 in FIG. 17, the flow ID 1712="WF002" and the step No. 1713="002". Hence, the corresponding step object is the object 9102b, and the corresponding step basic information is the information 9001b. The attribute information "remote program" of the step basic information 9001b is designated with "R002".

Note that the step specified by the flow ID 1712 and step No. 1713 recorded in this suspend information 1701 is the step, the processing of which cannot be completed in the flow control processing executed by the flow application 4006 described using FIGS. 14A and 14B. The remote control program 4101 which has been executed via the network application 4005 can accurately specify the suspended flow and the step as a start point from which the processing is to be restarted by processing the request from the browser.

In step S1808, the remote control program 4101 specified the step as a start point from which the processing of the suspended flow is to be restarted, and the remote program. Hence, the remote control program 4101 sends an HTTP redirect command to the address of the specified remote program, thus taking over the processing.

In step S1810, the remote control program 4101 generates a remote program access address (URL) used to access the remote program specified in step S1808 via the Web server 2009.

For example, as has been described in the example of step S1808, if the suspend ID designated in the remote program access address as an argument is "P001", the remote program is "R002". Hence, the remote control program 4101 generates a remote program access address (URL) used to access "R002" via the Web server 2009.

The remote control program 4101 also adds the suspend ID acquired in step S1801 and the user ID of the user who has been successfully authenticated in step S1803 to that remote program access address. The remote control program 4101 notifies the browser of the remote program access address generated in this way as an HTTP redirect destination URL. In the flowchart of FIG. 18, the processing to be executed by the remote control program ends in step S1810.

Upon reception of the notification of the HTTP redirect destination URL, the browser accesses that HTTP redirect destination URL.

Step S1811 and subsequent steps are processes to be executed by the remote program 4102, which is called and designated when the browser accesses the remote program access address notified as the HTTP redirect destination URL.

For example, as has been described in the example of step S1808, if the suspend ID designated as an argument in the remote program access address is "P001", the remote program is "R002" defined in the step basic information 9001b. Since the step basic information 9001b is that of the "display previews" step, "R002" must be the remote program used to display a preview. If the steps are different, the practical processing contents of the remote programs are different. For example, if the designated remote program is "R004" defined in the step basic information 9001d, it is the remote program corresponding to the "send mail" step.

In step S1811, the remote program 4102 receives a request, and acquires the suspend ID and user ID designated as arguments.

In step S1812, the remote program 4102 searches for the suspend information 1701 which includes the "suspend ID 1711" and "flow execution user 1715" that matches the suspend ID and user ID designated as the arguments. If no corresponding suspend information is found, the process advances to step S1813, and the remote program sends HTML data that displays an error message to the browser, thus ending the processing. If the corresponding suspend information 1701 is found, the process advances to step S1814.

In step S1814, the remote program 4102 acquires the path of the work area designated in "work area 1714" of the suspend information 1701 acquired in step S1812. As described in step S1416 of FIG. 14B, the work area recorded in the suspend information 1701 stores intermediate data and the like used in the step processing.

Figure 20:
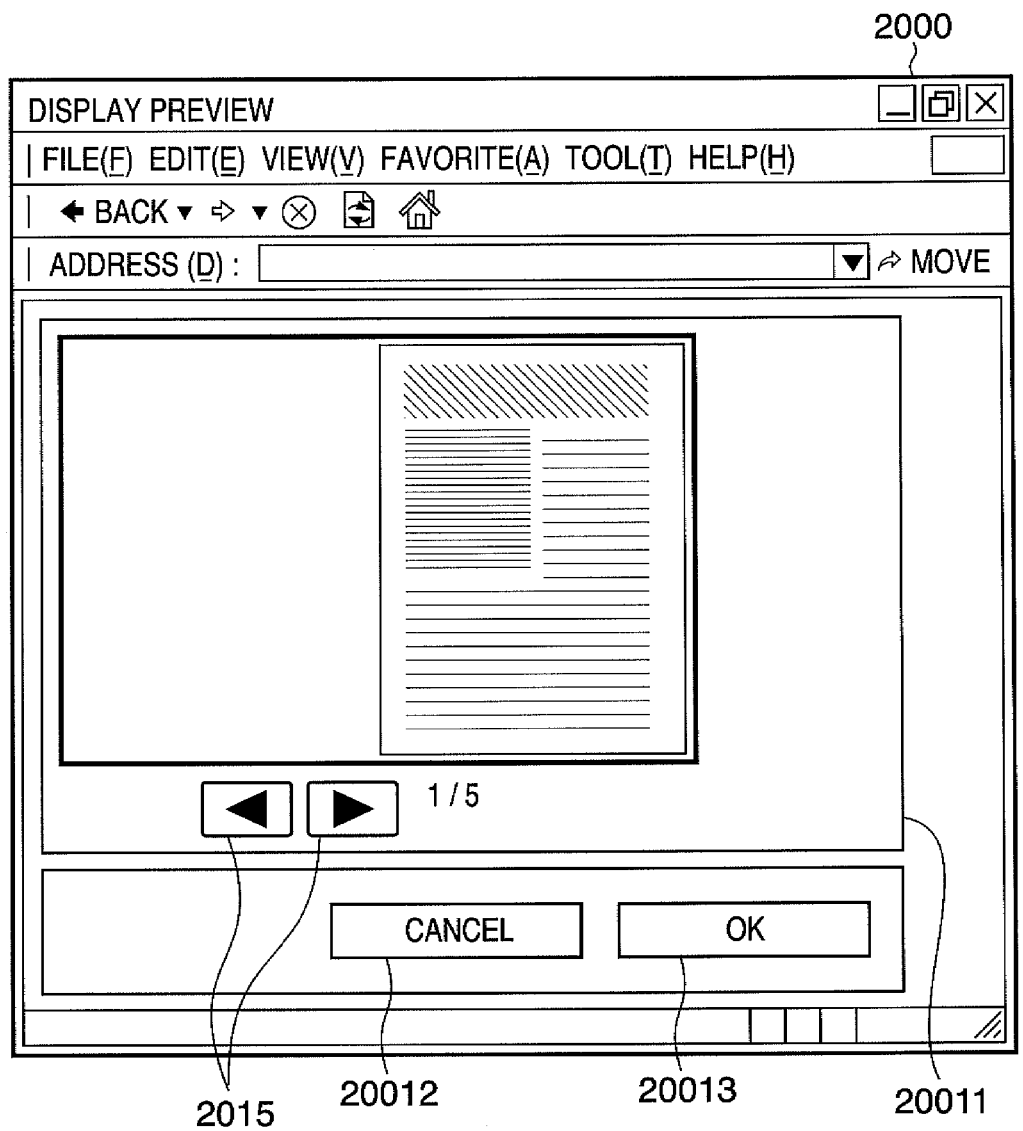
FIG. 20 shows a window display example of a "display preview" step.

For example, if the remote program 4102 which is currently executed is "R002" defined in the step basic information 9001b, the work area 1714 saves intermediate data required for the "display preview" step in the step basic information 9001b. For example, the intermediate data include preview image data files and the like. Hence, the remote program "R002" corresponding to the "display preview" step generates HTML data for displaying preview images using the data in that work area. The remote program 4102 is that for the step which requires a user's instruction. A user's instruction is accepted by the Web browser which displays data in an HTML format. Hence, the HTML data to be displayed by the remote program 4102 need to include a definition which notifies the remote program itself that outputs the HTML data of the input contents from the user, and the suspend ID and user ID acquired in step S1811. FIGS. 20 and 21 show a practical example.

FIG. 20 shows a display example on the browser which received the HTML data output in step S1814. FIG. 20 exemplifies a case in which HTML data for a preview window which is sent to the browser by the remote program "R002" defined in the step basic information 9001b is displayed on the browser. Reference numeral 2000 denotes a window of the browser. Reference numeral 2011 denotes a detail display area including a preview display area, page change buttons used to change the page position to be previewed, and the like. The detail display window 2011 is an example generated by the remote program "R002" corresponding to the "display preview" step, and the configuration of display items and the like changes depending on the steps. Reference numeral 2012 denotes a cancel button. Reference numeral 2013 denotes an OK button. The cancel button 2012 and OK button 2013 are instruction buttons which are always output as HTML data and are displayed on the Web browser irrespective of the remote programs.

FIG. 21 shows an example of the HTML format expression of the window shown in FIG. 20. Reference numeral 2101 denotes a definition which indicates using a "FORM" tag that a notification message including the user's input contents is sent to the remote program access address of the remote program "R002" indicated by "action" attribute information.

Reference numeral 2102 denotes a definition indicating that the suspend ID (P001) and user ID (U001) are defined as arguments. The definition 2102 is included in the definition 2101 as the contents of the "FORM" tag, and indicates that a notification message including these arguments is sent to the remote program access address defined in the definition 2101. Reference numeral 2103 denotes a definition of page change buttons displayed on the detail display area 2011 of FIG. 20. The definition 2103 is included in the definition 2101 as the contents of the "FORM" tag, and indicates that a notification message is sent to the remote program access address defined in the definition 2101 upon pressing of each defined button. Reference numeral 2104 denotes a definition of the cancel button 2012 and OK button 2013 in FIG. 20. The definition 2104 is included in the definition 2101 as the contents of the "FORM" tag, and indicates that a notification message is sent to the remote program access address defined in the definition 2101 upon pressing of each defined button.

On the window shown in FIG. 20, the user makes operations, for example, he or she presses the buttons included in the detail display area 2011 or presses the cancel button 2012 or OK button 2013. All the operations via the window shown in FIG. 20 are notified to the remote program access address and are processed. The processing of the remote program 4102 upon reception of a notification message from the browser will be described below with reference to FIG. 22.

(Processing of Remote Program 4102)

Figure 22:
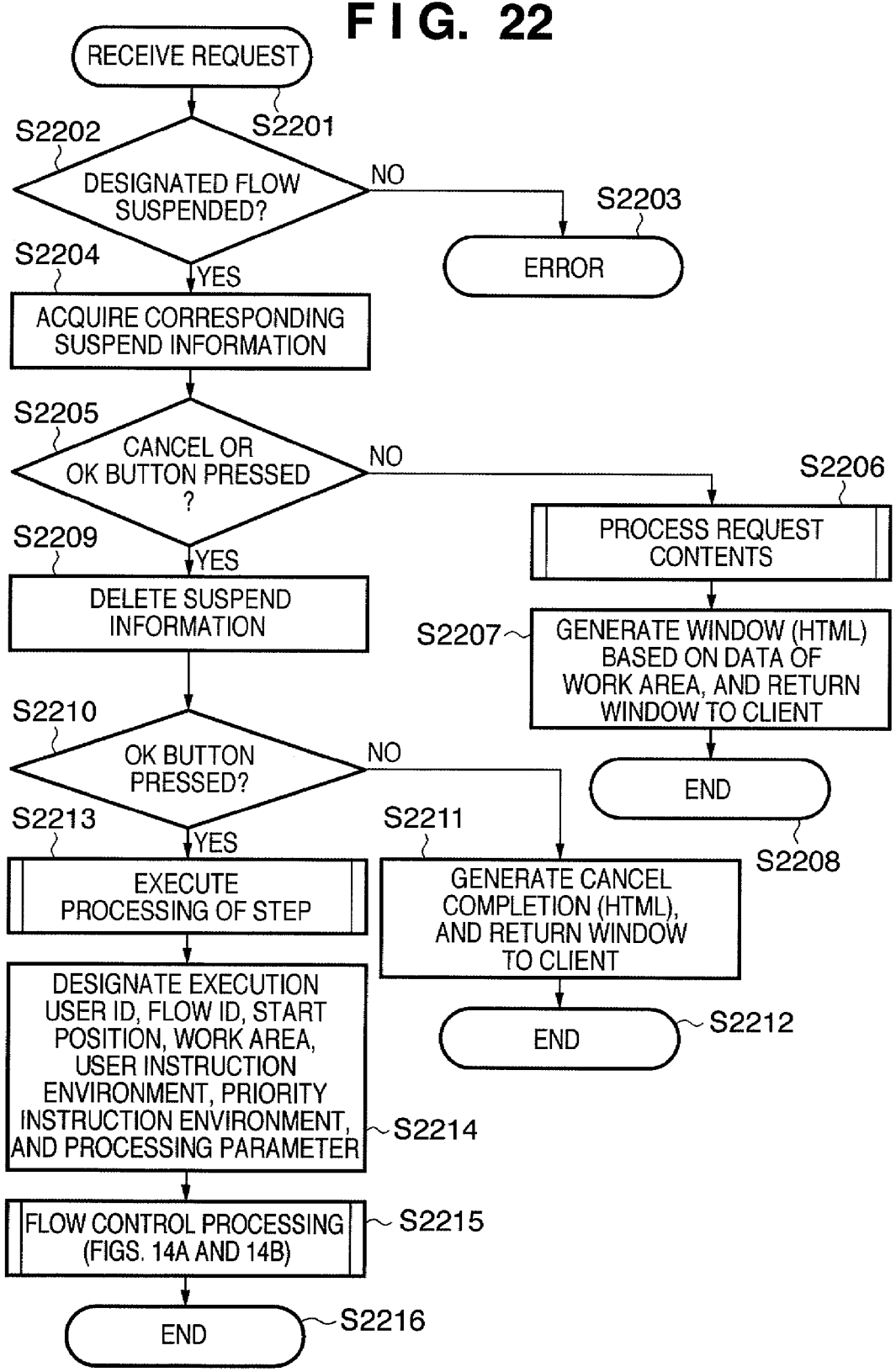
FIG. 22 is a flowchart showing the sequence of processing of a remote program.

FIG. 22 shows the sequence of processing to be executed by the remote program 4102 upon reception of a notification message from the browser that received the HTML data output from the remote program 4102 in step S1814 in FIG. 18.

In step S2201, the remote program 4102 receives a notification message from the Web browser.

In step S2202, the remote program 4102 searches for suspend information which includes the "suspend ID 1711" and "flow execution user 1715" that match the suspend ID and user ID designated as the arguments. If no corresponding suspend information is found, the remote program 4102 determines an error, and generates and sends HTML data that displays an error message to the Web browser, thus ending the processing. If the corresponding suspend information 1701 is found, the process advances to step S2204.

In step S2204, the remote program 4102 acquires the suspend information searched in step S2202. Then, the remote program 4102 acquires path information and the like of the work area 1714 that stores data required to execute the processing of the corresponding step by itself, and the process advances to step S2205.

In step S2205, the remote program 4102 analyzes information received from the Web browser in step S2201. The remote program 4102 then checks if the user presses the cancel button 2012 or OK button 2013, or other buttons shown in FIG. 20. Other buttons are those allocated within the detail display area 2011 shown in FIG. 20. In the example of FIG. 20, these buttons correspond to page change buttons 2015 used to change a page to be previewed. If the user presses the button allocated within the detail display area 2011, the process advances to step S2206. If the user presses the cancel button 2012 or OK button 2013, the process advances to step S2209.

Step S2206 is executed when the user presses the button allocated in the detail display area 2011. As has already been explained using FIG. 20, the contents of the detail display area 2011 are specialized to those of the step corresponding to the remote program. Hence, in step S2206 the remote program 4102 executes the processing specialized to that step.

For example, the page change buttons 2015 used to change a page to be previewed are allocated on the detail display area 2011 of the "display preview" window shown in FIG. 20. Upon pressing each page change button 2015, the process advances to step S2206 of the remote program "R002". At this time, in step S2206 the remote program 4102 executes processing for acquiring a preview image of a page designated by the page change button 2015. However, in step S2206 of another remote program which does not correspond to the "display preview" step, processing specialized to that of another step is executed.

In step S2207, the remote program 4102 generates and sends HTML data for displaying a window again based on the processing result in step S2206. The HTML data generated in step S2207 is the same as that generated by the processing executed in step S1814 in FIG. 18 described above. The remote program corresponding to each step generates HTML data that matches the contents of that step based on the processing result in step S2206. For example, in FIG. 18, the remote program "R002" sends, to the browser, preview display HTML data in which pages has been changed based on the result of the page change processing executed in step S2206. That HTML data has basically the same contents as those of the HTML data shown in FIGS. 20 and 21, except that a page to be previewed displayed in the detail display area 2011 has been changed.

The remote program ends the processing in step S2208 after it sends the HTML data. The window shown in FIG. 20 is displayed again on the browser.

If the user presses the buttons allocated within the detail display area 2011, or the cancel button 2012 or OK button 2013 of the Web browser by his or her operation, the process returns to step S2201 to repeat the processing.

Step S2209 is executed when the remote program 4102 determines in step S2205 above that the user presses the cancel button 2012 or OK button 2013. When the user presses the cancel button 2012, this means that he or she selects to cancel the processing of the flow. When the user presses the OK button 2013, this means that he or she selects to restart the processing of the flow. If the user presses either button, the flow exits the suspended state and is canceled or restarted. Hence, since the suspend information stored in the suspend information 1701 is not required, the remote program deletes the suspend information acquired in step S2204 from the suspend information 1701.

The remote program 4102 checks in step S2210 which of the cancel button 2012 and OK button 2013 the user presses. If the user presses the OK button 2013, the process advances to step S2213; if he or she presses the cancel button 2012, the process advances to step S2211.

Step S2211 cancels the processing of the flow in response to pressing of the cancel button 2012. The remote program 4102 generates HTML data that gives notification of completion of canceling of the flow, and sends it to the browser, thus ending the processing in step S2212.

In step S2213, since the user presses the OK button, the remote program 4102 completes the processing of the corresponding step. As a result, the flow can advance to the next step. There are various processing contents of step S2213 depending on the corresponding remote programs. Taking the "display preview" step as an example, since the need for previewing is obviated, the remote program executes processing for deleting preview images from the work area and the like.

In step S2214, since the user presses the OK button 2013, the remote program executes pre-processing for restarting the flow processing. More specifically, in order to call the flow control processing shown in FIGS. 14A and 14B, the remote program adjusts the required arguments.

The flow control processing shown in FIGS. 14A and 14B uses the arguments "execution user ID", "flow ID", "start position", "work area", "user instruction environment", and "priority instruction environment", as has been described in step S1401. The remote program designates, as the argument "execution user ID", the user ID included in the arguments notified by the browser in step S2201. The remote program designates, as the argument "flow ID", the item "flow ID 1712" included in the suspend information 1701 acquired in step S2204. The remote program designates, as the argument "start position", a start position obtained by shifting, by one, the start position defined by the value of "step No. 1713" included in the suspend information 1701 acquired in step S2204, so as to indicate the next step. For example, when the step No. acquired from the suspend information 1701 is "step No. 002", the remote program designates "step No. 003". The remote program designates, as the argument "work area", the item "work area 1714" included in the suspend information 1701 acquired in step S2204. The remote program designates, as the argument "user instruction environment", a value indicating that the user currently instructs from the remote program. The remote program designates, as the argument "priority instruction environment", "remote instruction priority" since the user currently issues an instruction from the remote program.

In step S2215, the remote program 4102 instructs the flow application 4006 to activate the flow control processing shown in FIGS. 14A and 14B by designating the arguments adjusted in step S2214. In this way, the processing of the remote program 4102 ends, and processing of the flow is executed again using the flow control processing shown in FIGS. 14A and 14B.

In step S2216, the remote program ends the processing.

As described above, even when the flow halts in a user's instruction waiting state, the user can issue an instruction from the Web operation program to restart execution of the flow.

(Explanation of Flow Control Processing)

The flow control processing activated in step S2214 will be described below. In the following description, assume that the following values are given as the arguments in step S2214. Note that the following values are arguments generated in step S2215 when the remote program 4102 shown in FIG. 22 is executed using the suspend information indicated by the data 1721-1 shown in FIG. 17.

Execution user ID="U001"
Flow ID="WF002"
Start position="step No. 003"
Work area="/flowarea/p001/"
User instruction environment="remote program"
Priority instruction environment="remote instruction priority"

The processes in steps S1401 to S1404 in FIG. 14A have already been described once, and the same processes are repeated.

Since the flow application 4006 determines in step S1405 that "remote instruction priority" is designated as the argument "priority instruction environment", the process advances to step S1413. Since the processes in step S1413 and subsequent steps have already been described, a repetitive description thereof will be avoided. However, as can be seen from the processes in step S1416 and subsequent steps, if the restarted step includes a setting that requires a user's instruction again, the execution of the flow is suspended again.

The method of restarting the processing of the flow from the computer 1004, notebook type computer 1006, or the like after the flow executed from the console 2050 of the MFP 1002 is temporarily suspended has been explained so far. However, the user does not always input a restart instruction from the computer 1004 or notebook type computer 1006. The user may come back to the MFP 1002 and may want to input a restart instruction of the processing of the flow. An example will be described below wherein it is possible to restart the temporarily suspended processing of the flow from the console 2050.

The user comes to the MFP 1002 to input a flow restart instruction, and begins to use the MFP 1002. In this case as well, the flow application 4006 displays the authentication window described above using FIG. 13. The user makes an input, and the flow application 4006 executes authentication processing. Since details of the authentication processing have already been described above with reference to FIG. 13, a detailed description thereof will not be repeated.

Upon completion of the authentication processing, the flow application 4006 displays the flow list window shown in FIG. 7 on the console 2050. When the user wants to restart the suspended flow, he or she presses a queued processing button 7002 shown in FIG. 7. Upon pressing the queued processing button 7002, the flow application 4006 displays a queued processing list window shown in FIG. 23, thus displaying a list of suspended flows.

Figure 23:
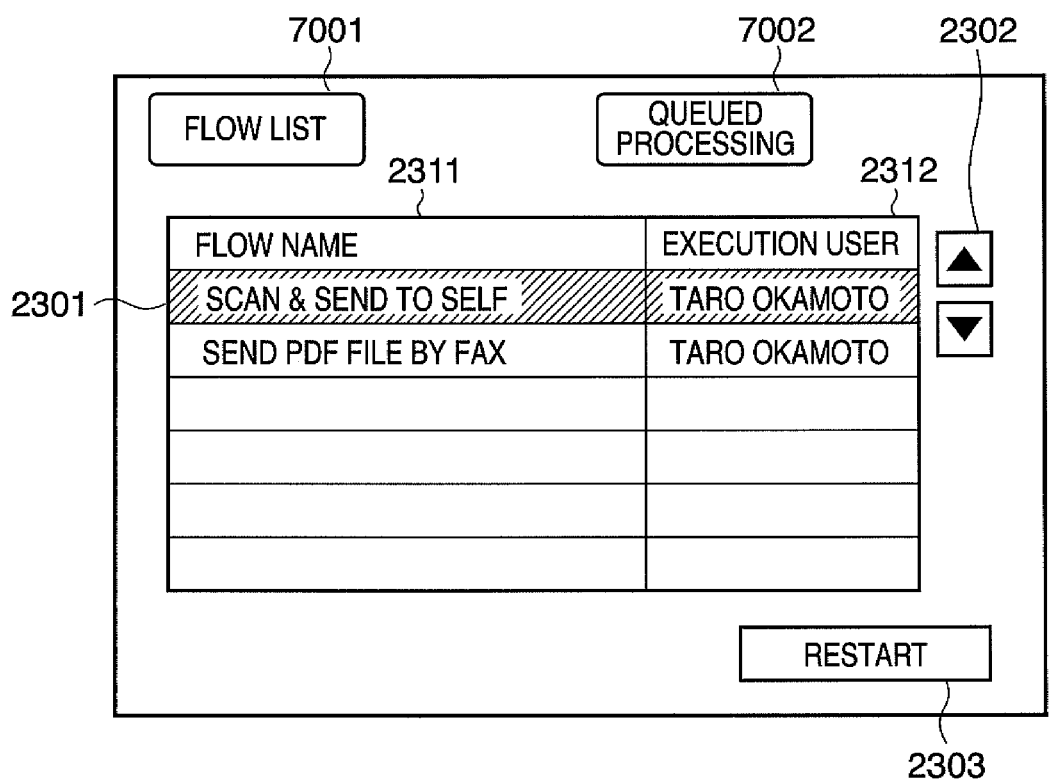
FIG. 23 shows a display example of a queued processing list window.

FIG. 23 shows an example of the queued processing list window that displays a list of suspended list. Upon pressing a flow list button 7001, the flow list window shown in FIG. 7 is displayed again. The queued processing button 7002 is displayed in a selected state to indicate that the currently displayed window is the queued processing list window. Reference numeral 2301 denotes a queued processing list.

The queued processing list 2301 includes a cell "flow name 2311" that displays the name of the suspended flow, and a cell "execution user 2312" that displays information of the user who executed the suspended flow. The queued processing list 2301 allows the user to select one flow that he or she wants to restart the processing. Reference numeral 2302 denotes scroll buttons. The scroll buttons 2302 allow the user to vertically scroll the queued processing list 2301. Reference numeral 2303 denotes a flow restart button. Upon pressing the flow restart button 2303, a restart instruction of the processing of the flow selected on the queued processing list 2301 is issued to the flow application 4006.

FIG. 24 is a flowchart for explaining the sequence of the processing for displaying the suspended processing on the queued processing list window shown in FIG. 23.

When the user who has cleared the authentication processing presses the queued processing button 7002 on the flow list window in FIG. 7 in step S2401, this processing is executed.

In step S2402, the flow application 4006 acquires the user ID of the user who has been authenticated in the previous authentication processing.

In step S2403, the flow application 4006 refers to the item "flow execution user 1715" in the suspend information shown in FIG. 17, and searches for and acquires suspend information in which the ID of the flow execution user equals the user ID acquired in step S2402.

In step S2404, the flow application 4006 refers to the flow object 9101 shown in FIG. 9B using the item "flow ID 1712" of the suspend information acquired in step S2404. Then, the flow application 4006 acquires information set in the attribute information "flow name" from the flow object 9101, the flow ID of which matches that of the suspend information. In this way, the flow application 4006 acquires all the flow names included in the suspend information acquired in step S2403.

The flow application 4006 outputs the acquisition result to the cell "flow name 2311" of the queued processing list 2301. The flow application 4006 searches for the attribute information "user ID" of the user object 9201. Next, the flow application 4006 outputs the found attribute information "user name" of the user master 9200 to the cell "execution user 2312" of the queued processing list 2301. Since the flow execution user is identical to the user who has executed the authentication processing, the user name displayed in the cell "execution user 2312" is that of the user who operates this queued processing list window.

As described above, the queued processing list window in FIG. 23 displays only the flows, for which instruction for execution was given by the operating user himself or herself but which were suspended.

(Sequence for Selecting Suspended Flow from List Window and Restarting Processing)

The sequence for selecting the suspended flow from this queued processing list window and restarting the processing will be described below.

FIG. 25 is a flowchart for explaining the sequence of the processing for restarting the suspended flow from the queued processing list window shown in FIG. 23.

In step S2501, the user selects one flow that he or she wants to restart from the queued processing list 2301, and presses the flow restart button 2303. In response to this operation, the flow application 4006 begins to execute the subsequent processes.

In step S2502, the flow application 4006 acquires suspend information of the flow corresponding to the selected row on the queued processing list 2301 from the suspend information 1701.

In step S2503, the flow application 4006 deletes the suspend information acquired in step S2502 from the suspend information 1701 since it can specify the flow processing to be restarted.

In step S2504, the flow application 4006 generates arguments required upon execution of the flow control processing shown in FIGS. 14A and 14B based on the suspend information acquired in step S2502.

The flow application 4006 designates, as the argument "execution user ID", the user ID of the authenticated user. The flow application 4006 designates, as the argument "flow ID", the flow ID acquired from the suspend information. The flow application 4006 designates, as the argument "start position", the step number (No.) acquired from the suspend information. The flow application 4006 designates, as the argument "work area", the work area acquired from the suspend information. The flow application 4006 designates, as the argument "user instruction environment", "console", since the user currently makes operations at the console 2050. When the user gives the instruction to restart the flow from the queued processing list window displayed on the console 2050, he or she is more likely to make the subsequent operations from the console. Hence, the flow application 4006 designates, as the argument "priority instruction environment", "console instruction priority".

In step S2505, the flow application 4006 executes the flow control processing shown in FIGS. 14A and 14B by designating the arguments generated in step S2504. All the designated arguments are equal to those at the beginning of execution of the flow upon pressing the flow button from FIG. 7, except for the argument "start position". If a different argument "start position" is designated, the processes in steps S1401 and S1402 in FIG. 14A produce the same results if other arguments are the same. As can be understood from the above description, the processes in step S1403 and subsequent steps are executed in turn from the suspended step since the step at the time of suspension is designated as the argument "start position".

As described above, when the user selects the suspended flow from the queued processing list window shown in FIG. 23 and presses the restart button, the suspended flow can be restarted from the suspended step.

Other Embodiments

Note that the objects of the present invention are also achieved by supplying a computer-readable storage medium, which records a program code of software that can implement the functions of the aforementioned embodiments to a system or apparatus. Also, the objects of the present invention are achieved by reading out and executing the program code stored in the storage medium by a computer (or a CPU or MPU) of the system or apparatus.

In this case, the program code itself read out from the storage medium implements the functions of the aforementioned embodiments, and the storage medium which stores the program code constitutes the present invention.

As the storage medium for supplying the program code, for example, a flexible disk, hard disk, optical disk, magneto-optical disk, CD-ROM, CD-R, nonvolatile memory card, ROM, and the like may be used.

The computer executes the readout program code to implement the functions of the aforementioned embodiments. Also, the present invention includes a case in which an OS (operating system) running on the computer executes some or all of actual processing operations based on an instruction of the program code, thereby implementing the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-104214, filed Apr. 11, 2007, which is hereby incorporated by reference herein in its entirety.

What is claimed is:

1. An image forming apparatus for executing a processing flow including a plurality of steps, said apparatus comprising:
    one or more processing devices; and
    one or more memory devices communicatively connected to the one or more processing devices and storing instructions configured to be executed by the one or more processing devices, the instructions comprising instructions for:
    acquiring definition information of the processing flow;
    identifying, if a step to be executed by the image forming apparatus in the processing flow is an instruction-required step as determined by reference to the definition information, a user required to complete the instruction-required step;
    displaying a first operation window on a display unit of the image forming apparatus, the first operation window configured to receive an instruction from the user at the image forming apparatus to complete the instruction-required step;
    measuring a duration of a waiting period where the instruction has not been received via the first operation window;
    if the duration of the waiting period exceeds a predetermined time period, (a) determining a pre-registered remote notification address for the user, and (b) transmitting remote execution information to the pre-registered remote notification address, the remote execution information configured to cause a second operation window to be displayed on a display unit of a remote device that is remote from the image forming apparatus, and the second operation window configured to receive the instruction from the user at the remote device to remotely complete the instruction-required step to be executed by the image forming apparatus; and
    if a particular step to be executed by the image forming apparatus in the processing flow is not the instruction-required step as determined by reference to the definition information, controlling execution of the particular step without displaying the first operation window and without transmitting the remote execution information.

2. The apparatus according to claim 1, wherein the instructions further comprise instructions for:
    monitoring whether the processing of the instruction-required step is completed or in an instruction-waiting state; and
    when said monitoring determines that the processing of the instruction-required step is in the instruction waiting state, and the user does not input an instruction within a predetermined period of time, setting the processing of the instruction-required step in a suspended state, generating a URL required to input an instruction for restarting the processing of the instruction-required step, and notifying an information processing apparatus of the URL.

3. The apparatus according to claim 2, wherein the instructions further comprise instructions for:
    storing, in the one or more memory devices, suspend identification information used to identify the instruction-required step in the suspended state, user identification information used to identify the user, and data required to restart execution of the instruction-required step.

4. The apparatus according to claim 3, wherein the instructions further comprise instructions for:
    authenticating the user based on the user identification information and a password;
    specifying the instruction-required step in the suspended state based on the user identification information and the suspend identification information;
    displaying data required to restart execution of the specified instruction-required step; and
    accepting an instruction from the authenticated user.

5. The apparatus according to claim 2, wherein the instructions further comprise instructions for allowing the information processing apparatus to access the URL using a Web browser, and wherein the URL indicates an address of the image forming apparatus.

6. The apparatus according to claim 1, wherein the instructions further comprise instructions for:
    determining that the processing flow to be executed includes a plurality of instruction-required steps; and
    selecting, for each instruction-required step, whether the user inputs an instruction from an information processing apparatus connected via a network or from a console of said image forming apparatus.

7. The apparatus according to claim 1, wherein the instructions further comprise instructions for:
    determining that the processing flow to be executed includes a first instruction-required step and a second instruction-required step;
    selecting, for the first instruction-required step, a notification destination of an operation window required to accept the instruction of the user; and selecting, for the second instruction-required step, a notification destination of the operation window based on the notification destination selected for the first instruction-required step.

8. A method of controlling an image forming apparatus for executing a processing flow including a plurality of steps, said method comprising the steps of:
acquiring definition information of the processing flow;
identifying, if a step to be executed by the image forming apparatus in the processing flow is an instruction-required step as determined by reference to the definition information, a user required to complete the instruction-required step;
displaying a first operation window on a display unit of the image forming apparatus, the first operation window configured to receive an instruction from the user at the image forming apparatus to complete the instruction-required step;
measuring a duration of a waiting period where the instruction has not been received via the first operation window;
if the duration of the waiting period exceeds a predetermined time period, (a) determining a pre-registered remote notification address for the user, and (b) transmitting remote execution information to the pre-registered remote notification address, the remote execution information configured to cause a second operation window to be displayed on a display unit of a remote device that is remote from the image forming apparatus, and the second operation window configured to receive the instruction from the user at the remote device to remotely complete the instruction-required step to be executed by the image forming apparatus; and
if a particular step to be executed by the image forming apparatus in the processing flow is not the instruction-required step as determined by reference to the definition information, controlling execution of the particular step without displaying the first operation window and without transmitting the remote execution information.

9. The method according to claim 8, further comprising:
a monitor step of controlling a monitor unit to monitor whether the processing of the instruction-required step is completed or in an instruction waiting state,
wherein when the monitor step determines that the processing of the instruction-required step is in the instruction waiting state, and the user does not input an instruction within a predetermined period of time, the method further includes the step of setting the processing of the instruction-required step in a suspended state, generating a URL required to input an instruction for restarting the processing of the instruction-required step is generated, and notifying an information processing apparatus of the URL.

10. The method according to claim 9, further comprising:
a storage step of storing, in a storage unit, suspend identification information used to identify the instruction-required step in the suspended state, user identification information used to identify the user, and data required to restart execution of the instruction-required step.

11. The method according to claim 10, further comprising the steps of:
controlling an authentication unit to authenticate the user based on the user identification information and a password;
controlling a specifying unit to specify the instruction-required step in the suspended state based on the user identification information and the suspend identification information;
displaying data required to restart execution of the specified instruction-required step; and
accepting an instruction from the authenticated user.

12. The method according to claim 9, wherein the image forming apparatus allows the information processing apparatus to access the URL using a Web browser, and wherein the URL indicates an address of the image forming apparatus.

13. The method according to claim 8, further comprising the steps of:
determining that the processing flow to be executed includes a plurality of instruction-required steps and
selecting, for each instruction-required step, whether the user inputs an instruction from an information processing apparatus connected via a network or from a console of the image forming apparatus.

14. The method according to claim 8, further comprising the steps of:
determining that the processing flow to be executed includes a first instruction-required step and a second instruction-required step;
selecting, for the first instruction-required step, a notification destination of an operation window required to accept the instruction of the user; and
selecting, for the second instruction-required step, a notification destination of the operation window based on the notification destination selected for the first instruction-required step.

15. A non-transitory computer-readable storage medium storing a program that, when executed by a computer, causes the computer to execute a method of controlling an image forming apparatus for executing a processing flow including a plurality of steps, said method comprising the steps of:
acquiring definition information of the processing flow;
identifying, if a step to be executed by the image forming apparatus in the processing flow is an instruction-required step as determined by reference to the definition information, a user required to complete the instruction-required step;
displaying a first operation window on a display unit of the image forming apparatus, the first operation window configured to receive an instruction from the user at the image forming apparatus to complete the instruction-required step;
measuring a duration of a waiting period where the instruction has not been received via the first operation window;
if the duration of the waiting period exceeds a predetermined time period, (a) determining a pre-registered remote notification address for the user, and (b) transmitting remote execution information to the pre-registered remote notification address, the remote execution information configured to cause a second operation window to be displayed on a display unit of a remote device that is remote from the image forming apparatus, and the second operation window configured to receive the instruction from the user at the remote device to remotely complete the instruction-required step to be executed by the image forming apparatus; and
if a particular step to be executed by the image forming apparatus in the processing flow is not the instruction-required step as determined by reference to the definition information, controlling execution of the particular step without displaying the first operation window and without transmitting the remote execution information.

* * * * *